US012811815B2

(12) United States Patent
White et al.

(10) Patent No.: US 12,811,815 B2
(45) Date of Patent: Nov. 24, 2026

(54) DECENTRALISED DIGITAL ASSET ARCHIVE

(71) Applicant: BRITISH TELECOMMUNICATIONS PUBLIC LIMITED COMPANY, London (GB)

(72) Inventors: Catherine White, London (GB); Jonathan Roscoe, London (GB); Robert Hercock, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/842,682

(22) PCT Filed: Feb. 8, 2023

(86) PCT No.: PCT/EP2023/053051
§ 371 (c)(1),
(2) Date: Aug. 29, 2024

(87) PCT Pub. No.: WO2023/165792
PCT Pub. Date: Sep. 7, 2023

(65) Prior Publication Data

US 2025/0175336 A1 May 29, 2025

(30) Foreign Application Priority Data

Mar. 3, 2022 (GB) ..................................... 2202941

(51) Int. Cl.
*H04L 9/00* (2022.01)
*G06F 16/182* (2019.01)
(Continued)

(52) U.S. Cl.
CPC ............ *H04L 9/50* (2022.05); *G06F 16/1837* (2019.01); *G06F 21/64* (2013.01); *H04L 9/0643* (2013.01);
(Continued)

(58) Field of Classification Search
CPC ....... H04L 9/50; H04L 9/0643; H04L 9/3239; H04L 63/105; H04L 67/104; G06F 16/1837; G06F 16/137; G06F 21/64
See application file for complete search history.

(56) References Cited

U.S. PATENT DOCUMENTS 9,807,106 B2 10/2017 Daniel et al.
11,037,227 B1 * 6/2021 Padilha ................ G06F 21/602
(Continued)

FOREIGN PATENT DOCUMENTS

CN 108985732 B 9/2020
CN 111949672 11/2021
(Continued)

OTHER PUBLICATIONS

J. Li, J. Wu, L. Chen. Block-secure: Blockchain based scheme for secure P2P cloud storage. Information Sciences. Oct. 1, 2018; 465:219-31. (Year: 2018).*
(Continued)

*Primary Examiner* — Robert B Leung
(74) *Attorney, Agent, or Firm* — Nixon & Vanderhye P.C.

(57) ABSTRACT

A method of storing storage units representing digital assets into a decentralised repository arranged in a peer-to-peer network comprising a plurality of peer computing systems, to create an archive of the digital assets, comprising steps of, for each new storage unit being submitted to the archive by a submitting peer computer system: determining a specific quantity of stored existing storage units, each of which the new storage unit is to be cryptographically linked to, where
(Continued)

the existing storage units have been previously submitted to the archive; selecting specific ones of all of the existing storage units up to the received specific quantity of stored existing storage units, where the selection has been made from existing storage units stored by specific ones of the peer computing systems; performing cryptographic processing by taking as inputs to such cryptographic processing, the selected specific existing storage units and the new storage unit, and obtaining a result of such cryptographic processing; adding the result into the new storage unit; and distributing the new storage unit to a plurality of peer computing systems, thereby adding the new storage unit to the decentralised repository.

20 Claims, 17 Drawing Sheets

(51) Int. Cl.
*G06F 21/64* (2013.01)
*H04L 9/06* (2006.01)
*H04L 9/32* (2006.01)
*H04L 9/40* (2022.01)
*H04L 67/104* (2022.01)

(52) U.S. Cl.
CPC .......... *H04L 9/3239* (2013.01); *H04L 63/105* (2013.01); *H04L 67/104* (2013.01)

(56) References Cited

U.S. PATENT DOCUMENTS

| | | | |
|---|---|---|---|
| 12,265,953 B1 | 4/2025 | Harrison | |
| 12,418,417 B1 | 9/2025 | Chen | |
| 2002/0114341 A1* | 8/2002 | Sutherland | H04L 41/00 370/428 |
| 2012/0284794 A1 | 11/2012 | Trent et al. | |
| 2018/0075247 A1 | 3/2018 | Campero et al. | |
| 2018/0077184 A1 | 3/2018 | Thom | |
| 2018/0359096 A1 | 12/2018 | Ford et al. | |
| 2019/0123895 A1 | 4/2019 | Blake | |
| 2019/0141054 A1 | 5/2019 | Signorini | |
| 2019/0238316 A1 | 8/2019 | Padmanabhan | |
| 2019/0340361 A1 | 11/2019 | Daniel et al. | |
| 2020/0142986 A1 | 5/2020 | Ragnoli et al. | |
| 2020/0143372 A1 | 5/2020 | Liu et al. | |
| 2020/0320211 A1 | 10/2020 | Moore | |
| 2020/0323030 A1 | 10/2020 | Mehta | |
| 2020/0344248 A1 | 10/2020 | De Jesus | |
| 2020/0351116 A1 | 11/2020 | Jetzfellner | |
| 2021/0044609 A1 | 2/2021 | Keshtkarjahromi | |
| 2021/0117410 A1 | 4/2021 | Sekniqi | |
| 2021/0176038 A1* | 6/2021 | Bortnikov | H04L 9/0894 |
| 2021/0243007 A1 | 8/2021 | Kramer | |
| 2021/0263907 A1 | 8/2021 | Krueger | |
| 2022/0058282 A1 | 2/2022 | Ricotta, Jr. et al. | |
| 2022/0365922 A1 | 11/2022 | Kofman | |
| 2023/0070625 A1 | 3/2023 | Gaur | |
| 2024/0146756 A1 | 5/2024 | Debenedetti | |

FOREIGN PATENT DOCUMENTS

| | | |
|---|---|---|
| CN | 113872923 | 12/2021 |
| EP | 3575953 | 12/2019 |
| GB | 2588812 A | 5/2021 |
| JP | 2020530958 | 10/2020 |
| KR | 20210087461 | 7/2021 |
| KR | 20220015435 | 2/2022 |
| WO | 2020142906 A1 | 7/2020 |
| WO | 2020240321 A1 | 12/2020 |
| WO | 2026/019623 | 1/2026 |
| WO | 2026/024864 | 1/2026 |

OTHER PUBLICATIONS

R. Kothari, B. Jakheliya and V. Sawant, “A Distributed Peer-To-Peer Storage Network,” 2019 International Conference on Smart Systems and Inventive Technology (ICSSIT), Tirunelveli, India, 2019, pp. 576-582, doi: 10.1109/ICSSIT46314.2019.8987748. (Year: 2019).*

Benisi, N. Z., Aminian, M., & Javadi, B. (2020). Blockchain-based decentralized storage networks: A survey. Journal of Network and Computer Applications, 162, 102656. (Year: 2020).*

International Preliminary Report on Patentability dated Sep. 12, 2024, issued for International Application No. PCT/EP2023/053051 (9 pages).

International Preliminary Report on Patentability dated Sep. 12, 2024, issued for International Application No. PCT/EP2023/053057 (6 pages).

International Preliminary Report on Patentability dated Sep. 12, 2024, issued for International Application No. PCT/EP2023/053053 (7 pages).

International Search Report and Written Opinion of the ISA for PCT/EP2023/053051, mailed Apr. 19, 2023, 15 pages.

International Search Report and Written Opinion of the ISA for PCT/EP2023/053053, mailed May 2, 2023, 13 pages.

International Search Report and Written Opinion of the ISA for PCT/EP2023/053057, mailed May 4, 2023, 12 pages.

Combined Search and Examination Report for GB2202941.7, dated Jul. 28, 2022, 6 pages.

Combined Search and Examination Report for GB2202950.8, dated Jul. 28, 2022, 8 pages.

Combined Search and Examination Report for GB2202955.7, dated Jul. 28, 2022, 7 pages.

Tianzhi Yang et al., “A Blockchain based Smart Agent System Architecture”, ICCSE’19, Oct. 18-21, 2019, Jinan, China, pp. 33-39.

Davide Calvaresi et al., “Multi-Agent Systems and Blockchain: Results from a Systematic Literature Review”, Conference Paper, Jun. 2018, 16 pages, at URL: https://www.researchgate.net/publication/324444516.

Serguei Popov, “The Tangle”, Apr. 30, 2018, Version 1.4.3, 28 pages, URL: https://assets.ctfassets.n et/r1dr6vzfxhev/2t4uxvs lqk0EUau6g2sw0g/45ea e33637ca92f85dd9f4a3a 218e1ec/iota1_4_3.pdf.

U.S. Appl. No. 18/842,682, filed Aug. 29, 2024, Decentralised Digital Asset Archive.

U.S. Appl. No. 18/842,712, filed Aug. 29, 2024, Distributed Software Agents for Managing a Decentralised Peer-to-Peer Storage Network.

U.S. Appl. No. 18/842,708, filed Aug. 29, 2024, Mutable Digital Asset Storage Units for Verifying Other Storage Units in a Decentralised Peer-to-Peer Storage Network.

Office Action dated Jan. 22, 2026, issued for U.S. Appl. No. 18/842,712 (35 pages).

Ammar Odeh et al., “Federated Learning and Blockchain Framework for Scalable and Secure IoT Access Control”, Computers, Materials & Continua, Jun. 2025, Tech Science Press, Doi: 10.32604/cmc2025.065426, Apr. 28, 2025 (16 pages).

Lukas Stockburger et al., “Blockchain-enabled decentralized identity management: The case of self-sovereign identity in public transportation”, Blockchain: Research and Applications 2 (2021) 100014, May 7, 2021 (18 pages).

Kazuya Takeuchi et al., “Decentralized Identity Verification System for Data Access to Prevent Data Exfiltration Ransomware”, Journal of Preprints, Dec. 7, 2023 (11 pages).

Hong Su et al., “Embedding Smart Contract in Blockchain Transactions to Improve Flexibility for the IoT”, IEEE Internet of Things Journal, vol. 9, No. 19, Oct. 1, 2022 (13 pages).

Office Action dated Apr. 23, 2026, issued for U.S. Appl. No. 18/842,712 (30 pages).

Extended European Search Report dated Sep. 24, 2026, issued for European Application No. 26179071.1 (9 pages).

(56) References Cited

OTHER PUBLICATIONS

Zirui Cheng et al., “Secure Retrieval-Augmented Generation against Poisoning Attacks”, 2025 IEEE International Conference on Big Data (Big Data) (8 pages).
Zhaoqi Wang et al., “Combating Knowledge Corruption in Agent Systems: A Byzantine-Tolerant Secure Collaborative RAG Framework”, WWW ’26, Apr. 13-17, 2026, Dubai, United Arab Emirates (2026) (12 pages).
Extended European Search Report dated Sep. 28, 2026, issued for European Application No. 26179073.7 (9 pages).
Xhixiong Chden et al., “Decentralized Identification and Community-Corroborated for Multi-Agent Access Control and Trust Management”, 2025 IEEE International Conference on Big Data (Big Data) (10 pages).
Extended European Search Report dated Sep. 28, 2026, issued for European Application No. 26179072.9 (10 pages).
B. V. Satish BABU et al., “A Survey on Blockchain For Access Control Models: Security, Transparency, and Challenges”, 2025 3rd International Conference on Disruptive Technologies (ICDT) (8 pages).

* cited by examiner

Fig. 4

| | Patch | |
|---|---|---|
| (1) | **Hash** | 00000000839a8e6886ab5951d76f411475428afc90947ee320161bbf18eb6048 |
| (2) | **Creator** | a65b2a0ec9e090cdb49d1c3514b88f49fc66f0a59e4d556dc57e21c2e36818f2 |
| (3) | **Patches** | 0000000ba4868b3f277c8e387b55d9e3d0be7c045cdd89e, 00000063ad9e5f6b5b2aa749d903c6bdf64d5af2ef12a1 |
| (4) | ... | ... |

1. Present on all tokens A hash generated from the attributes of the token
2. Present on all tokens This is a public key hash that can be evaluated by all to verify the creator
3. Present on all tokens a list of at least 1 hashes for patches this patch is attached to.
4. Optional We would expect any number of additional fields that may contain data or operations to be interpreted as appropriate by clients for the application.

DECENTRALISED DIGITAL ASSET ARCHIVE

CROSS-REFERENCE TO RELATED APPLICATIONS

This application is the U.S. national phase of International Application No. PCT/EP2023/053051 filed Feb. 8, 2023, which designated the U.S. and claims priority to GB 2202941.7 filed Mar. 3, 2022, the entire contents of each of which are hereby incorporated by reference.

FIELD OF THE DISCLOSURE

The disclosed technology relates to a decentralised digital asset archive for storing a plurality of digital assets in a peer-to-peer network comprising a plurality of distributed peer computing systems.

BACKGROUND OF THE DISCLOSURE

A digital asset archive is used to store a plurality of digital assets so that they can be archived thus providing a history or complete set of digital assets. For example, if a census is being taken, it is important to keep track of each person, each birth certificate or other documentation regarding the people being counted in the census. Other types of digital assets which could benefit from being archived for posterity include digital audio recordings, audio/visual materials, digital representations of various works of art such as paintings, computer program files, or votes in an election.

With these digital asset archive, it is very important that all the digital assets remain stored over time, without being deleted or altered. This could be done using a traditional centralized digital asset store, such as an SQL database, but then, because of the centralized nature of the storage, one entity is in control of the storage, and so it is difficult to have confidence that the digital assets have not been altered or deleted.

SUMMARY OF THE DISCLOSURE

The present disclosed technology provides a method of storing digital assets into a decentralised repository arranged in a peer-to-peer network comprising a plurality of peer computing systems, to create an archive of the digital assets. The method comprises the steps, for each new digital asset being submitted to the archive by a submitting peer computer system.

A corresponding system and computer program are also provided for providing the method.

BRIEF DESCRIPTION OF THE DRAWINGS

The following drawings are provided for illustration of examples of the described methods, systems and computer programs:

FIG. 4 shows an example of a header of a patch according to an arrangement illustrating the technology of the present disclosure;

DETAILED DESCRIPTION

Figure 1:
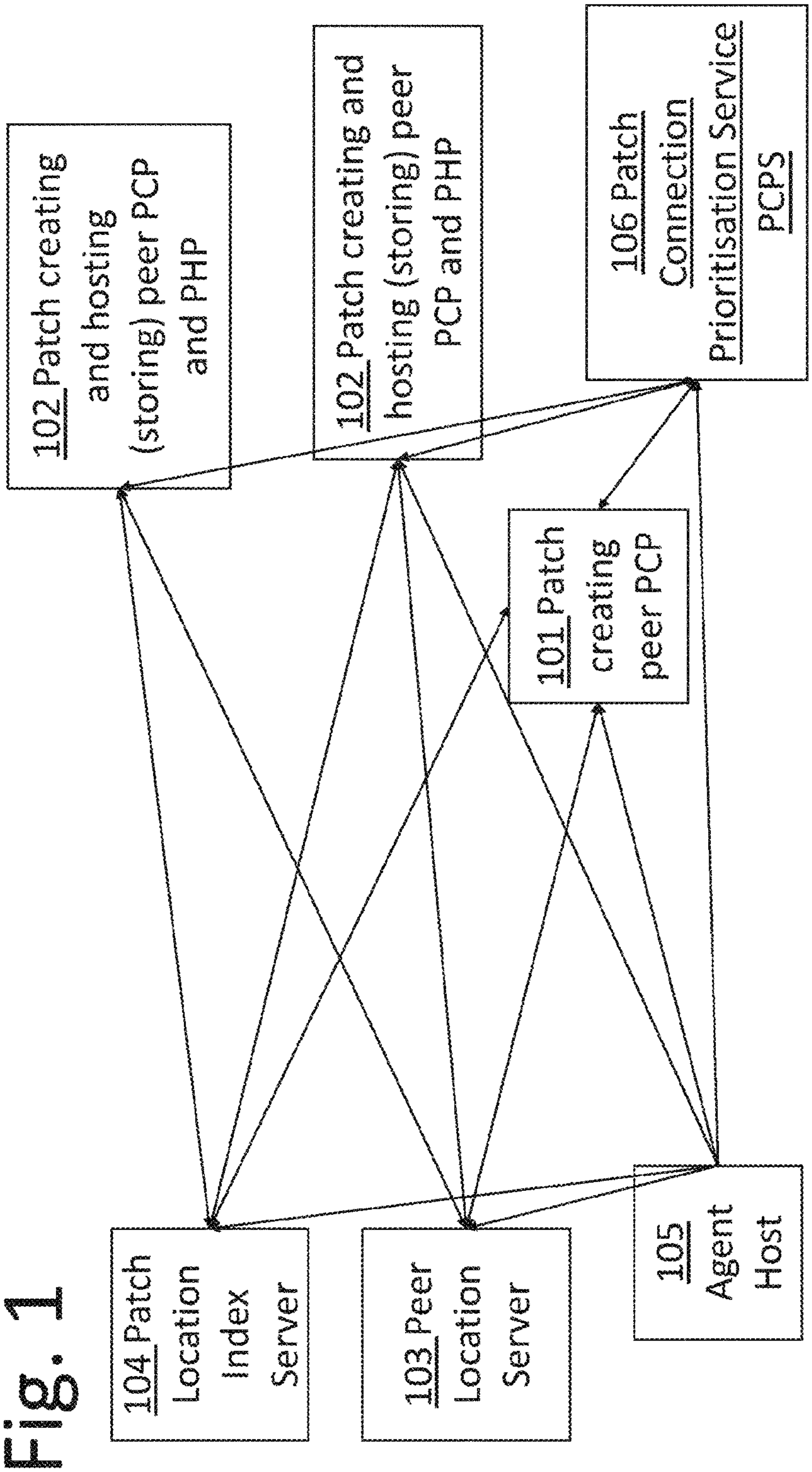
FIG. 1 is a block diagram showing the various peer computing systems which can play a role in carrying out the technology described here, according to one illustrative arrangement.

FIG. 1 is a block diagram showing the various peer computing systems which can play a role in carrying out the technology described here, according to one illustrative arrangement. A peer computing system can be a separate computing system, or a process, running within a computing system (where many such processes could be running on the same computing system, such as, for example, a virtual machine environment as is well known).

At 101, there is shown a patch creating peer (PCP), which is a peer computing system (e.g. a personal computer or other device, which can run a computer application or service, or a temporary application on such a device such as a dynamic html webpage) which is attempting to add a new digital data asset (or patch) to the distributed repository. Patches are digital files representing an asset of some kind (such as a document, work of art, etc) similar to blocks storing transactions in Blockchain, but patches need not be of fixed size, they can be instead marked using a header and/or footer, for example using XML or JSON of other well-known such file format.

102 identifies a patch creating peer (two of such peers 102 are shown in FIG. 1 for illustrative purposes) which is also functioning as a patch storing (or, equivalently, hosting) peer. A peer computing system which is both a patch creating peer and a patch storing peer can both add a new digital asset to the repository as well as store existing digital assets which have previously been added to the repository). The existing patches are generally stored on a plurality of such peers 102, thus making the repository decentralised. There could, of course, also be peers 102 which do not also act as a patch creating peer. The peer 101 can also act as a peer 102 (peer 101 can also act as a patch hosting peer).

103 identifies a peer location server (or peer repository server) peer computing system, and this peer performs the function of providing, to a requester peer (such as a patch creating peer 101), addresses of peers 102 which store patches. In this way, for example, the peer 103 can be asked to provide addresses of peers 102, which a patch creating peer 101 can use to request copies of existing stored patches. The peer 103 manages the peers, including metrics such as trust (which may be updated by software agents which will be described below), and locates and manages addresses/locations of patch hosting peers.

104 identifies a patch location index server (or patch hosting location index server) peer computing system as shown, and this peer performs the function of identifying patches (for example, from a match of a patch ID or matching some other metadata criteria), and provides addresses of peers 102 that store (or know the location of) such identified patches. Peer 104 provides a lookup table that goes from patch to peer. So peer 104 manages the locations in which patches are cached on the network. Patch hosting peers typically register the IDs of the patches that they store with the patch location index server, and provide look-up services based on patch ID to find the patch hosting peers which contain copies of the patch.

105 identifies an agent host peer computing system and this peer 105 performs the function of crawling the peers and updating the index server peer computing system with locations of patches, and also looks for cryptographic inconsistencies, and reports these to the index servers.

106 identifies a patch connection prioritisation service (PCPS) which performs a service of promoting patches which are weakly connected to the overall storage network, and therefore not strongly verified and are therefore at risk of being altered or deleted (for example because few other patches are connected onto them/verify them, so the goal is to promote these weak patches so that new patches will connect onto them). In one implementation, an existing patch is considered weakly connected to the overall storage network if the existing patch has been cryptographically linked to by a number of other existing patches, where the number is below a threshold, which can be set according to the requirements of the application and the network. In some implementations, peer 106 could be hosted by the same system that hosts the peer location server and/or the peer location index server. There are normally multiple instances of the PCPS, and although they do not have to be perfectly synchronised at all times, there will preferably be a process of message passing between PCPS instances that belong to the same network, such that when one patch is deprioritised in one PCPS (because it has become strongly connected to/verified), then if the patch is also registered in another PCPS, it is also deprioritised there.

A patch connection promotion table can be used as the data structure which supports the operation of a PCPS. This table can have a plurality of columns, including a first column identifying a patch ID of a patch which is being promoted as being weakly connected (and therefore should be linked to by a new patch), and a second column identifying the IDs of patches which connect to the particular patch ID identified in the first column (the second column could be empty if the patch was extremely weak). The table could also have a third column indicating a patch creator peer 101 that submitted this patch (it could be identified by an IP address, a domain name or a MAC address), a fourth column indicating a category field for the patch (e.g., one or more topics or categories into which the patch is classified), and a fifth column indicating that this patch is offering a reward to a new patch that wishes to connect to it, and specifies the number of new patches for which the reward will be offered and the amount of the reward. In some implementations, the reward offered may vary as a function of the order in which the patch connects, for example the reward may exponentially decay (e.g. halve) for each successive new patch that connects to an existing patch, until the requested number of patches is reached, at which point the reward may drop to zero.

Software agents (which will be described below) could be used to find patches which are not well connected to, and move them up the patch promotion connection table to a higher priority position.

In operation, the PCPS receives a new patch ID from a patch creating peer, and this could include fields such as a path category and the level of connectivity (verification) requested (i.e. how many existing patches should connect to this one), and the PCPS places the new patch at a high priority location of the patch connection promotion table (typically it would be placed at the top of the table).

The PCPS also receives a request from a patch creating peer (or other service) to find patches which are suitable to connect a new patch to. This request includes associated fields for the new patch such as identifying the patch creating peer because it is preferable not to link the new patch back to patches that are being hosted by the same peer that is creating them, and also categories/topic, for new patch recommendations. The PCPS then works down the table and adds the highest priority patches to the suggestion list (e.g. in the simplest implementation it would take the top 10 etc) but in a better implementation it probabilistically adds them to the suggested list with a probability which is a function of (increases with) a reward function/match function which has a decentralisation term (which increases (is more likely to be accepted) if the patch host for the patch in the table is different to the patch creator peer and not associated with it), a term based on the level of connectivity requested by the patch in the table (some patches may request/pay for increased verification/connectivity) and optionally a term for similarity of category/ies (if there is a similarity in category than it is more likely to be selected), and then a random number generator is used and according to whether the random number is within a threshold set by the reward function the patch is accepted probabilistically to go on the acceptance list. It will be apparent that several equivalent variations of this suggested implementation exist, for example the function may be a penalty function, in which case the patch is accepted if the random number generated exceeds the threshold.

Finally, the list of suggested connections is sent to the patch creating peer, which then builds the new token with connections to these other patches suggested to it. In some implementations, the patch creating peer may reject the suggested patches and ask for different ones (e.g. maybe one of the suggested patches cannot be found, such as in the event the network is down).

The PCPS receives a notification from a patch creating peer that a new patch (with a patch ID x) is linked onto (verifies) a patch in the table with patch ID y, and this is important in the case where a reward is due (as explained above). Optionally, PCPS checks/verifies that patch ID x has correctly verified (connected to) patch ID y, by checking a token of patch ID x (checking the calculation and making sure the token y is included as a constituent in the new token of x, such as by repeating the 'checksum', i.e. the calculation of the whole or part of the new token of x which is dependent on the value of the token of y). Then, the PCPS will amend the table for patch ID y and made a note that a patch has connected onto it, and also deprioritises the patch for patch ID y (such as by moving it down the table or setting a counter to a higher number which makes it more likely to be skipped going forwards). When the patch ID y has received a sufficient number of connections onto it (and is thus sufficiently verified) it may be dropped from the PCPS table, in order to free up memory/storage.

If a patch contains incorrect claims, or breaches policy in some way (for example contains content that is not permitted as part of the network), then ideally no other patches will connect to it. This is helpful as patches which remain unverified are spotlighted as probably containing incorrect cryptographic verification assertions, or content that is not endorsed by other peers. However, without a method to handle it, the risk is that these patches are never deprioritised in the patch connection promotion service (PCPS) peers, which would waste computational resources as these patches are continuously rechecked. Therefore, the PCPS peers may apply a policy which expires patches from the PCPS after a length of time, or at least deprioritises them. Further, the PCPS may move patches into a secondary table, which is used to select patches for connection onto with a much lower probability than the primary table. (This gives deprioritised patches a chance of being reverified in future.) This method may be extended to further tables with lower levels of selection probability from each one.) In other implementations, PCPS peers may notify other PCPS peers of patches which are weakly verified, and they may be advertised at other peers for a time, before deprioritisation policies are applied at the other peers too.

There may be more than one of the above peers, even though only one is shown in the illustrative example of FIG. 1. Also, one peer could play the role of one or more other peers that are illustrated in this example.

The plurality of interacting peers (hosting server computers, for example), therefore make up a storage network, having, in some implementations, a similar architecture to the World Wide Web (WWW). In the WWW, a web page links to other (existing) web pages using hyperlinks, whereas, in the storage network described here, a patch links to existing patches by performing a cryptographic operation, as will be described below, based on the existing patches and the digital content of the new digital asset being added to the storage network, and a result of the cryptographic operation is added to the new asset (patch).

Figure 2A:
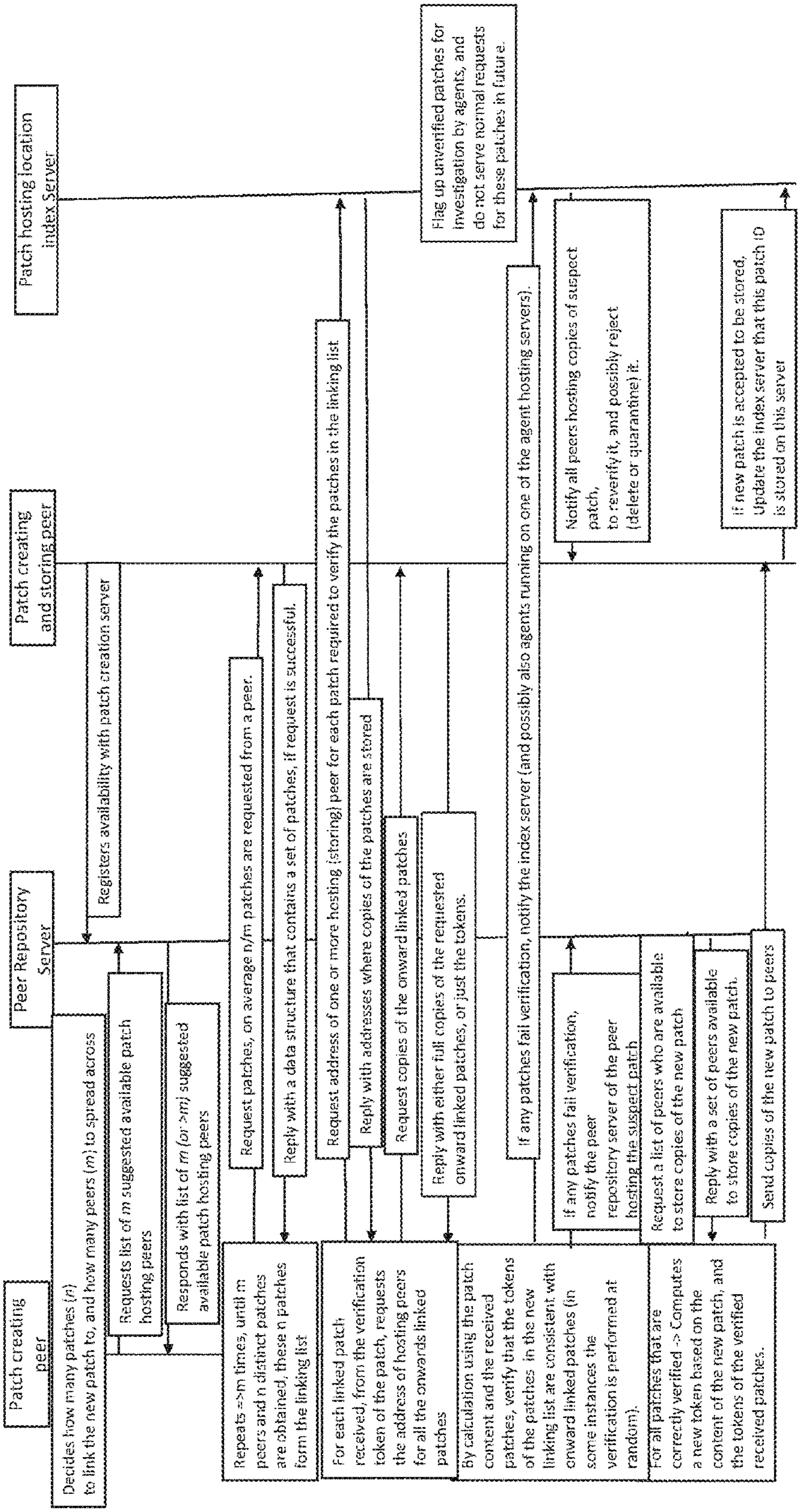
FIGS. 2*a* and 2*b* are sequence diagrams, illustrating the functional steps which take place, when a new patch (digital asset) is being added to the decentralized repository, according to one illustrative arrangement of the disclosed technology.

FIG. 2*a* shows a sequence diagram, illustrating the functional steps which take place, when a new patch (digital asset) is being added to the decentralised repository, according to one illustrative arrangement of the disclosed technology.

At the top left of FIG. 2*a*, a patch creating peer 101 is attempting to add a new patch to the decentralised repository. A determination is made of how many (that is, an integer quantity n) existing patches should be used to link the new patch to. This determination can be made by any of the peers in the decentralised network, or by a combination of such peers.

The number n may be assigned a default value (such as 3) or, the number n is obtained by the peer 101, or another peer in the network, calculating a metric based on the various criteria as will be described below.

A determination is also made of how many (that is, an integer quantity m) patch storing peers 102 should be used to obtain the n existing stored patches. For example, if n is 12, m could be 4, and then 3 patches would be obtained from 4 different peers 102. Again, this determination can be made by any of the peers in the decentralised network, or by a combination of such peers.

Moving down the left side of FIG. 2*a*, the peer 101 next makes a request to the peer 103 for a list of m available peers 102. Peer 103 then responds with a list of m available peers 102. Peer 103 could respond with a list of more than m available peers 102, if this is determined by peer 103 to be useful for the specific application.

The determination as to the number n of existing patches that a new patch should link to, as well as which specific patches should be selected to make up the n patches, as well as the number m of patch hosting peers 102 used to access the n existing patches, can be made based on different criteria, such as how much security, or resilience, is required and whether the new patch shares a theme with some existing patches (e.g. the new digital asset of the new patch is of a similar type or content as some existing digital assets corresponding to existing patches). For example, the peer 101, or some other peer in the network, could calculate a metric based on the current size of the network, and another metric based on what is required in terms of strength (resilience or security). Specifically, an epsilon value of the probability of this network, or part of the network, ever getting compromised (meaning an undetectable mutation of one or more patches), so epsilon could be, for example, 1 in 10 million. In some implementations, the network calculates and reports the current recommended number of patches for a given epsilon. For example, a peer 101 may want to add into the network a criterion, or request, that the strength should be better than 1 in 20 million, which is higher than the standard of 1 in 10 million and this is the requested probability of anyone being able to change it within 500 years. The network could then reply with a specific number for n, such as 6 patches. The network could also reply with an indication that the 6 patches should be these specific 6 patches which are located on the far side of the network to meet the criteria of the peer 101's request. The specific mathematical formulas to be used here, for the stochastic (statistical) methods are known and can be found in academic papers, studies of cryptographic hash functions, statistics and graph theory. For example, the probability of mutation of a patch A which is linked onto (verified by) by a single patch B, is given by the probability of collision for the chosen cryptographic hash function used to create the token in patch B, on mutating the part of patch A which is inputted according to the rules of the implementation into patch B.

If only the token of the first patch is used in calculating the second patch token, then the probability of mutability of the first patch is closely related, and solely dependent on, the collision probability of the hash function (or other function) used in calculating the token of the first patch. For example, the probability of finding a collision in a number (j) of attempts (feasible in a certain number of CPU-years), is given by the probabilities of finding a hash collision of the information content of the first patch with the token of the first patch in a certain number (k) trials, which is a standard calculation.)

In the above implementation, increasing the number of connections onto the first patch merely increases the difficulty of any entity changing the token belonging to the first patch (which, if it were possible, would therefore allow free mutation of the content within the first patch). But it does not increase the difficulty of calculating a collision that matches the first patch token.

However, we can change the cryptographic 'stitching'—i.e. linking functions in such a way that increased connectivity to a token also increases the resistance to the collision function of the hash function. This is preferably done by including all of the information content of the first patch (or critical, and well-defined parts, of the information such that this definition cannot itself be mutated—for example it is a constant of the implementation), as well as the whole information content of the second patch in calculating the token of the second patch.

While this may require very slightly more expense in the memory usage and computation when calculating the tokens, this implementation is preferable because it means that in order to mutate any given patch, it is necessary to find a collision such that the new string representing the first patch and its token does not change the correct computed value token of the second patch. Furthermore, to remain consistent, the mutation of the first patch must also collide with the correct computed value of the token of any third, fourth and subsequent patch that also connects onto the first patch. The difficulty of mutating the first patch, in this implementation, therefore increases with the number of connections. Therefore, it is strongly preferred over the implementation in which the second patch token is only a function of the first patch token.

Figure 15:
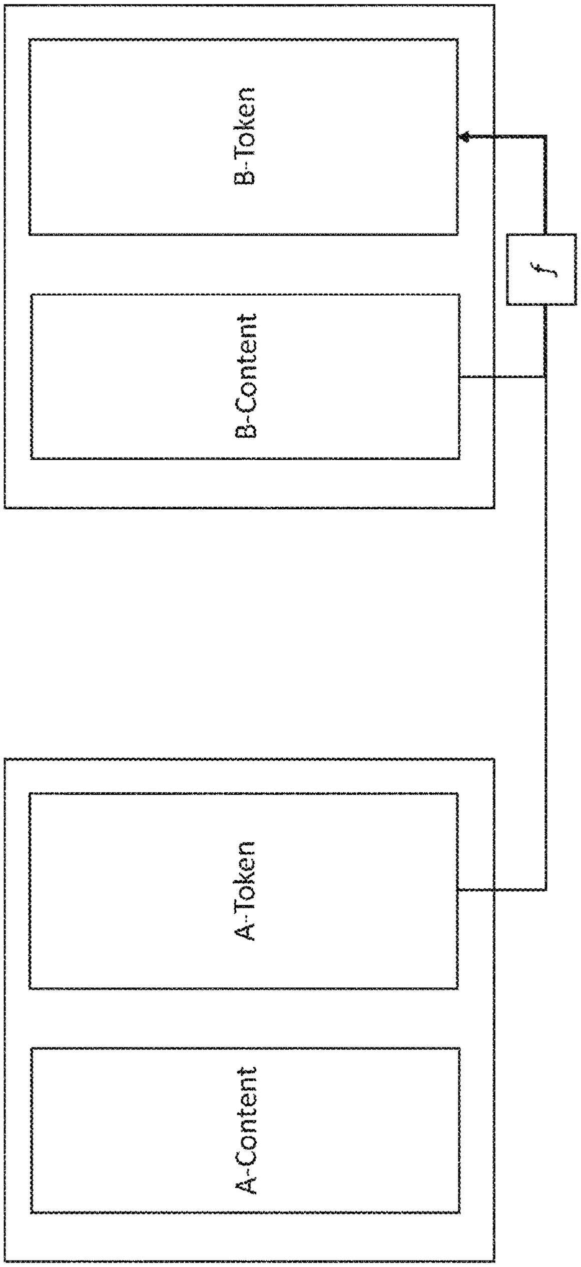
FIG. 15 is a block diagram showing links between blocks according to a preferred embodiment.

In FIG. 15, B links onto A. ƒ denotes the function of the string A-Token plus the string B-Token; B-token is a function of A-token and B-content (this is the limited method of joining). In the general case, B links onto more than one patch (e.g. A1, A2 and A3), and B-token is then a function ƒ of A1-token, A2-token, A3-token and B-content. Alternatively, in the preferred method, B links onto A. ƒ denotes the function of the string A-Token plus the string B-Token; B-token is a function of A-content, A-token and B-content. In the general case, B links onto more than one patch (e.g. A1, A2 and A3), and B-token is a function of A1-content, A1-token, A2-content, A2-token, A3-content, A3-token and B-content.

The limited method still has value as increased connections onto a patch will increase the network's knowledge and verification of the existence of the patch, even though it does not increase the difficulty of mutating the patch content.

In summary, the epsilon value is the probability that an attacker can change a patch value (without creating a detectable inconsistency in the tokens of patches that link to (verify) the patch) within a certain length of time t or number of attacks p which is a default for the network. Epsilon is normally chosen to be as low as possible, and the less the degree of trust, the lower it may need to be. In some implementations, the number of connections made to a patch (number of verifications) is calculated by PCPS as a function of the current graph structure to ensure that a default or requested level of epsilon is achieved or bettered by the structure.

Moving further down the left side of FIG. 2*a* the peer 101 then sends a request to the m peers 102 for the n existing patches. This could be done by dividing equally the n patches between the m peers (as in the example given above), but also, this could be done in an uneven manner, by requesting more patches from a peer 102 which has greater availability or greater trust. This process repeats until all the n existing patches have been obtained from the m peers 102. This collection of n existing patches will form the linking list, to which the new patch will be cryptographically linked. Because a new patch is linked to multiple existing patches, not just one existing patch, as in typical Blockchain implementations, attempts at fraud, such as those attempting to add, delete or modify a patch, are made more difficult.

The patch creator peer 101 sends a message to the peer location server noting the level of trust required (for example indicated by an epsilon value) and optionally also any other metadata that will affect the choice of peers. The peer location index server applies an algorithm (which at its simplest may be random selection) to select a number of peers which together will provide sufficient connectivity to meet the trust criteria and any other criteria such as grouping by topic.

A peer 102 makes a selection as to which of the entire collection of existing patches should be selected to satisfy the peer 101's request for patches. That is, peer 101 requests n patches but doesn't specify which specific patches should be supplied. Each peer 102 selects the specific patches to supply to peer 101 to satisfy that peer 102's respective portion of peer 101's request.

This selection can be random, where peer 102 simply makes a random selection of existing patches, while taking into account that it is important to select existing patches which have not so far been frequently selected (i.e., where the patchwork is "thin") so as to strengthen the overall fabric/repository. As explained above, the selection process may use the patch connection promotion service to return suggested weakly verified patches. Alternatively, the selection process may search a model of the existing verifying connections. Various known strategies or algorithms in computer science can be used to determine where the patchwork is "thin". For example, according to graph theory (in mathematics, graph theory is the study of graphs which are mathematical structures used to model pairwise relations between objects), if the graph of linked nodes/patches has a minimum cut (or min-cut) which is a cut (a partition of the vertices of a graph into two disjoint subsets) that is minimal in some metric, that is where new patches should be placed (linked to which specific existing patches). To support this, preferably whenever a patch connects onto (verifies) a new patch it sends a message to one or more of the patch location index servers which hosts a service which provides a lookup from a patch ID, to the ID of patches which it verifies (or claims to verify.) This functionality may be supported, for example, by a table, which we refer to as the verified-by table, that is hosted at the patch location index server, or another server which may be queried by the patch location index server. This is preferably updated by the patch creator peer, which as it creates a new patch which links onto existing patches, will submit this information together with the full new patch string to the patch location index server. The patch location index server will preferably verify that the new patch string is consistent with the stated cryptographic linkages that are stated within it (the existing patches that the new patch links onto), and the ID of the existing patches in these cryptographic linkages are then iterated through, and a lookup entry in the verified-by table is made from the existing patch ID to the new patch ID. This allows the patch location index service to construct the directed graph (i.e. network) which represents the linkages onto each patch, by representing the existing patch IDs as the nodes in the graph and creating an edge for each entry in the verified-by table. We refer to this directed graph as the verified-by graph. In this way, the patch location index server holds knowledge of the cryptographic linkages between patches, as well as the addresses of peers on which patches are held. (Alternatively, these two functions may be split into separate, independent services which communicate over the network to exchange information where necessary, or the knowledge of the cryptographic linkages between patches may be implemented as part of the patch connection process services, which must always have at least a partial version of information required to create the graph of verification links.) Various algorithms are known for finding the min-cut of a directed graph, using for example the Ford-Fulkerson approach [Dantzig, G. B.; Fulkerson, D. R. (9 Sep. 1964). "*On the max-flow min-cut theorem of networks*"; L. R. Ford & D. R. Fulkerson (1957) "A simple algorithm for finding the maximum network flows and an application to the Hitchcock problem", *Canadian Journal of Mathematics* 9:210-18] or alternatively the approximate min-cut of a graph, for example [*Approximate Max-Flow Min-(Multi)Cut Theorems and Their Applications, SIAM Journal on Computing*, Vol. 25, No. 2*, Society for Industrial and Applied Mathematics*]. In some implementations, different patch location index servers may cover (or predominantly cover) certain parts of the graph, with some overlap between coverage. This allows the mincut algorithm (or other weakly connected node algorithm) to run on local verified-by graphs, which has the effect of approximately parallelising the search for weakly connected nodes across each patch location index server. Alternatively, the software agents (to be described below) may crawl the network checking patches one by one, and finding those for which there are few or no cryptographic links onto these patches, and report to one, several or all of the patch location index servers or patch connection promotion servers when they find a patch that is weakly verified (connected onto.) This has the technical advantage of allowing the collection of patches to grow randomly in many different directions and dimensions, and this reduces the contention problem that often exists in such peer-to-peer networks such as Blockchain based architectures, which always grow in a linear fashion (new blocks always have to be added to the end of a chain), whereas, with the presently disclosed technology, there are always pre-existing patches to link a new patch to (there is no competition to get a new asset added, as there is in Blockchain). New patches can be added anywhere, even on top of existing patches, by which we mean that the graph of 'verified-by' linkages between patches (the graph nodes) does not need to be (and preferably should not be) a planar graph.

Figure 3:
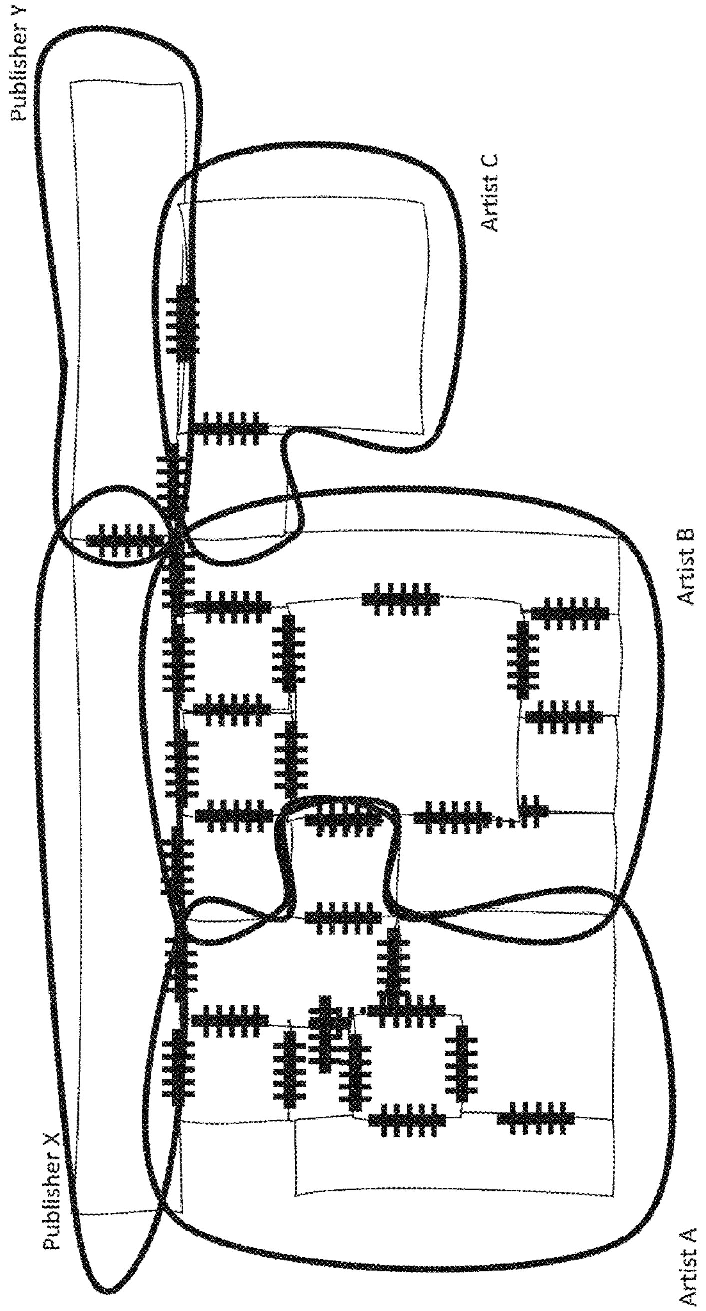
FIG. 3 is a diagram showing an example archive, where the digital assets are grouped semantically.

Alternatively, this selection of existing assets can be performed non-randomly. Specifically, the existing patches (assets) chosen to link to a new patch (asset) can be selected based on content, such as, for example, assets of a particular type (such as if the digital assets are musical songs) then new patch containing a new song can be linked to existing songs by the same musical artist or owned by the same recording label. This could result, for example, in a collection of patches organized semantically as shown in FIG. 3, where patches in the top left are songs from Publisher X, songs in the top right are from Publisher Y, songs in the bottom left are from Artist B, songs in the middle bottom are from Artist B and songs in the bottom right are from Artist C. In this case, the goal of selecting existing patches which have so far not been frequently selected (as in the "random" selection above) is still a baseline goal, but, where there are two existing patches which satisfy the baseline goal and one of them has similar content to the new patch, then that one with the similar content is chosen instead of the existing patch that does not have the similar content.

This semantic selection of patches has the technical advantage of making it easier to find patches, as related patches are grouped together. Other advantages of semantic selection are that participants can choose to reinforce their patches and make them more secure, or access control can be used, allowing participants to secure an area of the archive for exclusive write use.

However, if there exists extreme distrust in the network (between groups of participants that control the peers), it would be better to follow the random, highly delocalised approach to forming new connections between patches described above. This prevents a subset of servers gaining complete control over a subsection of the 'patchwork' i.e. the directed graph (network) which describes the patches (data nodes) and the links between them. For example, a more secure method would be the random approach which protects the archive from attacks where a particular party may be trying to prevent a new patch from being added as it is being added, or to modify the contents of a new asset as it is being added. Placing similar assets together makes it easier for such fraudulent attacks to take place, because of localisation on the virtual network of cryptographic linkages, which means that the entries related to similar themes verify each other, whereas, with the more random and widely distributed approach to cryptographic linkages, it is harder for a fraudulent party to attempt to control any complete part of the dependent verifications. Similarly, ensuring that the patches being connected onto by a new patch are hosted by a diverse set of patch hosting peers makes it more difficult for a fraudulent party to intervene as a new asset is being added by another party, because it would require collaboration across many different patch hosting peers to affect the inputs (from the existing patches being linked onto) which go into the calculation of a verification token by the new patch. The rules set by the patch connection process service are one method by which these different connection strategies can be implemented, as explained above.

As mentioned above, the selection of which specific n existing patches to choose is also selectable based on the criteria provided by the peer 101, in terms of desired resilience, security and other factors.

As should be clear from the above, many different strategies can be used to select the number n of existing patches, as well as which specific n existing patches should be selected for the new patch to link to. The new storage technique described here is thus very flexible in this regard.

The peer-to-peer network can be arranged so that settable parameters are provided, depending on the level of trust desired by a particular application (sometimes a random approach can be used, and sometimes a semantic approach, according to characteristics of the patch information content, can be used, in the selection of existing assets to be used for the linking).

Also, artificial intelligence algorithms could be used to cluster patches together on the same patch creating host or set of hosts (or, alternatively, to make sure patches with similar features are not clustered or hosted together) depending on the desired level of trust.

We note that one aspect of increasing the resilience and trustworthiness of the network is to increase the distribution of the patches on the patch hosting peers, and ensure that copies are preferably distributed across a resilient set of hosts located in different geographies and controlled by different entities/organisations. The peers should use a strategy of preferably replicating to diverse peers, and optionally in some implementations, this can be reinforced by software agents (which will be described below) which request or perform replication of patches between hosting peers that they identify as highly diverse from each other.

A second aspect of increasing the resilience and trustworthiness of the network is to increase the diversity of connections by cryptographic links between patches created by, and also hosted by, different peers. In the suggested implementation, this is primarily achieved by the suggestions made by the patch connection promotion service to a given patch creator peer.

The described storage technique is very resilient and scalable, as there is always a peer server that is available to provide existing patches for a patch creating peer to connect a new patch to. There is no need for the patch creating peer to have to wait to get a position in the storage network that other patch creating peers are competing for (as in other distributed peer-to-peer architecture such as Blockchain). Therefore, the problem of congestion and contention for the opportunity of adding new information to the storage network is solved by the distributed and open nature of connectivity that this solution provides.

Moving further down the left side of FIG. 2*a*, the peer 101 then performs the function of verifying each of the n patches to determine if they are valid (legitimate or bona fide). This is done by checking, for example, the first of the n patches, to examine a token in that first patch, to determine, from that token, which existing patches the first of the n patches, states that it links to. For example, the first of the n patches may have a token which asserts that the first of the n patches links to 15 other patches, and the tokens or the whole content of those 15 patches are included in the calculation of the token for the first of the n patches, and the links are provided for such 15 patches as well, so now, as part of this verification process, peer 101 will go through each of the 15 links and collect the tokens (or the whole patch) and checks that the cryptographic functions that have been performed to perform the linking for that first patch to the 15 patches, are accurate (for example, that the signatures add up). Specifically, the peer 101 performs the verification by taking the tokens, or whole value (as appropriate to the implementation) from the patches that the first of n patches is to link to, appends them together, and add them to the content of the first patch, and then determining whether the peer 101 indeed gets the same digest (or signature, or hash digest output) as what is being reported in the first patch. This process is then repeated for the second of the n patches, and so forth, up to n.

This above verification process helps to strengthen the integrity of the patchwork, because new patches will only link to existing patches which can be verified. This will leave patches which do not have verifiable, correctly valid tokens with no new patches linked to them; which is desirable as incorrect patches create confusion, are erroneous, and may be intended to defraud the intended purpose of network, which is to act as a complete and immutable trusted data store This verification process happens, as illustrated in FIG. 2*a*, as follows. The peer 101 requests the patch hosting location index server 104 to provide an address of one or more hosting peers 102 for each of the 15 patches that the first of the n patches is stated as linking to (following the example above). The peer 104 then responds with a list of addresses of peers 102 where the patches are stored. Peer 101 then makes requests to each peer 102 (which was just identified by peer 104), requesting copies of the onward 15 linked patches. The peers 102 then reply with copies of the requested 15 patches (or, in some implementations, just the tokens from such patches).

There could be thousands of such peers 102 involved, because the peer 101 is communicating with m peers 102 to obtain copies of the patches to link to, and then, in this presently described verification process, the peer 101 is communicating with many more peers 102, to obtain copies of the patches that each of the n patches, in turn, links to.

The verification process described above is one level deep, however, a more robust verification process could check multiple levels of past linkages, but this of course takes much more processing time and power. The role of the patch connection promotion service in making sure that all patches receive onward connections from new patches means that multiple levels of checking of past linkages is not normally necessary by patch creation peers, because good coverage of all the linkages in the network will be obtained over the course of time as patches are added in different areas. However, special routines run by special purpose entities such as agents may be implemented to check (cryptographically verify) multiple levels of past linkages.

In FIG. 2*a*, the verification function is shown in two stages, the first stage involves the interaction with the peer 104 to obtain the information needed to do the verification, and then, further down the left side of FIG. 2*a*, the verification is actually performed by peer 101.

As part of this second stage, as shown in FIG. 2*a*, if any of the 15 patches fails verification, the peer 101 informs the peer 104 of this failure, so that the peer 104 can update its store, accordingly, so that future requests are not meeting the same result of an invalid cryptographic calculation. Peer 104 can then flag up this situation to a software agent for investigation.

Peer 101 could also provide this information to the relevant peers 102, however, this may not be appropriate as it may be important to not alert the peer 102 that the peer 101 (and peer 104) are aware that there is a problem (for example, a peer 102 may have made a unilateral change to the patch, to change the accurate version of history, which could be a fraudulent situation).

Peer 101 would, however, notify the peer 103 of the problem situation, so that the peer 103 does not provide the address of the problem peer 102 to future peers 101 who wish to add future patches to the repository.

Peer 104 is shown in FIG. 2*a* as notifying the peers 102 which host copies of the suspect patch, requesting that such peers 102 reverify the suspect patch, and possibly reject it, or quarantine it, so that the situation can be contained.

If there is a failure of verification, and so not enough verified patches are obtained, then the previous step of obtaining patches from peers 102 is repeated until n verified patches are obtained by peer 101.

Due to the use of the verification process, such as described above, the integrity of existing patches can be checked based on the cryptographic relationships between the existing patches and their attached patches. Accordingly, because integrity checking is built-in, this reduces the need for an energy intensive consensus mechanism to be employed (as is required by a traditional Blockchain implementation), thus greatly saving energy that is typically required in Blockchain by the mining process, which is typically required to add a new block to the Blockchain.

Now, we move to the bottom left of FIG. 2*a*, where, for each of the n patches that are correctly verified, the peer 101 computes a new token based on the content of the new patch and the content of the n verified received patches. This is the performance of the cryptographic function where the n patches that the new patch is to link onto are provided as inputs to the function, and the new patch is also provided as an input to the function, and the output of the function is a digest (cryptographic seal or token).

Specifically, the digital content of the new patch (which is the digital information that is being newly added to the repository, such as a new birth certificate or song) is appended to the digital content of each of the n patches (and this digital content of each of the n patches includes not only the digital content of the particular assets (e.g, the existing songs) but also the digests (or tokens) that are stored along with each of the n existing assets). After this appending takes place, the entire appended string is subjected to the cryptographic function. The output of the function is then called a digest or token. This digest/token is then added to the new patch along with the digital content of the new asset being newly stored. Also added to the new patch is a reference to each member of the set of n existing patches (this could be the identifiers (ID's) of the n existing patches, but it could also be the digests of the n existing patches, links, such as hyperlinks, to such n existing patches, or even the entire contents of the n existing patches).

The cryptographic function could be a cryptographic hash function. As is well known, this hash function involves running a function on a long (variable length) digital string of bits and you have, as an output, a shorter (fixed length) code which is a digest of the long digital string of bits. It is collision resistant, and pre-image resistant, which makes it difficult to find mutations to the input string which yield the same output string as the original input string did.

In cases where, for example, it is important to know which entity has calculated the hash function, a digital signature could be calculated in addition to the hash function, and this would then require, for example, an asymmetric private key to be used with a digital signature algorithm on the content of the patch, including the token, and the digital signature to be added (e.g. appended) to the patch, to provide the extra information regarding the identity of the party carrying out the cryptographic operations. These digital signature cryptographic techniques are well known, and any of a plurality of cryptographic primitives can be used, including RSA and Elliptic Curve techniques; the verification of the digital signature can further use the matching public key, which may be stored on a trusted system such as public key infrastructure (as is well known).

Instead of using a simple hash function (such as SHA256 or an almost-universal hash function) which produces a digest or token, the output of the cryptographic function could be the solution to a more computationally intensive calculation in relation to the digital content, for example, calculating the string which must be appended to the digital content in order that the result of the chosen cryptographic hash function is a designated point in the output domain. The advantage of invoking a problem with a significant amount of work to complete the token that makes the patch valid is that it makes any attempt to rewrite history particularly computationally demanding, as each step of the process of searching for a new patch content string which creates a token which is the same as the original would involve significant computational work, instead of relatively efficient, as computing a hash function is. Many other types of known cryptographic functions could also be used to link the patches together. In this way, a link is developed between new patches and a subset of existing patches/assets, which seriously hinders the possibility of altering historical records in the repository. We note that because of the increased connectivity of the network, this computationally demanding 'mining' process need not be as computationally hard as is required for typical Blockchain implementations, and it is sufficient for the patch creating peer to compute it, rather than for multiple different servers to compete to try to mine a given transaction (which involves duplicating work, and is inefficient.)

As shown in FIG. 2*a*, the peer 102 then requests of the peer 103 a list of the peers 102 which are available to store copies of the new patch. The peer 103 replies with a list of such peers 102. The peer 101 then distributes the new patch to such peers 102 on the list, who then retain the new patch in their local copies of the repository, leading to all such peers 102 growing a larger and larger fabric/repository. And also, each of the peers 102 updates the peer 104 that the patch is now saved on the respective peer 102. In this way, the new patch is added to the decentralised repository, thus adding another digital asset to the archive, and adding another item to the historical record or collection of such assets.

Accordingly, the new patch is not necessarily stored on all peers 102, as is the case with other technologies such as Blockchain. In some cases, full replication on all peers 102 may be carried out, but an important aspect of the disclosed technology is that full replication is not required. By not usually storing new patches on all peers 102, the fabric does not grow unmanageable in resource consumption, this means that resource consumption will scale much better with the size of the information stored on the fabric/repository, compared to Blockchain. If each patch is distributed to n peers (exactly, or on average over all peers), then the storage consumption over the whole network will scale linearly with the number of items stored in the repository.

Figure 2B:
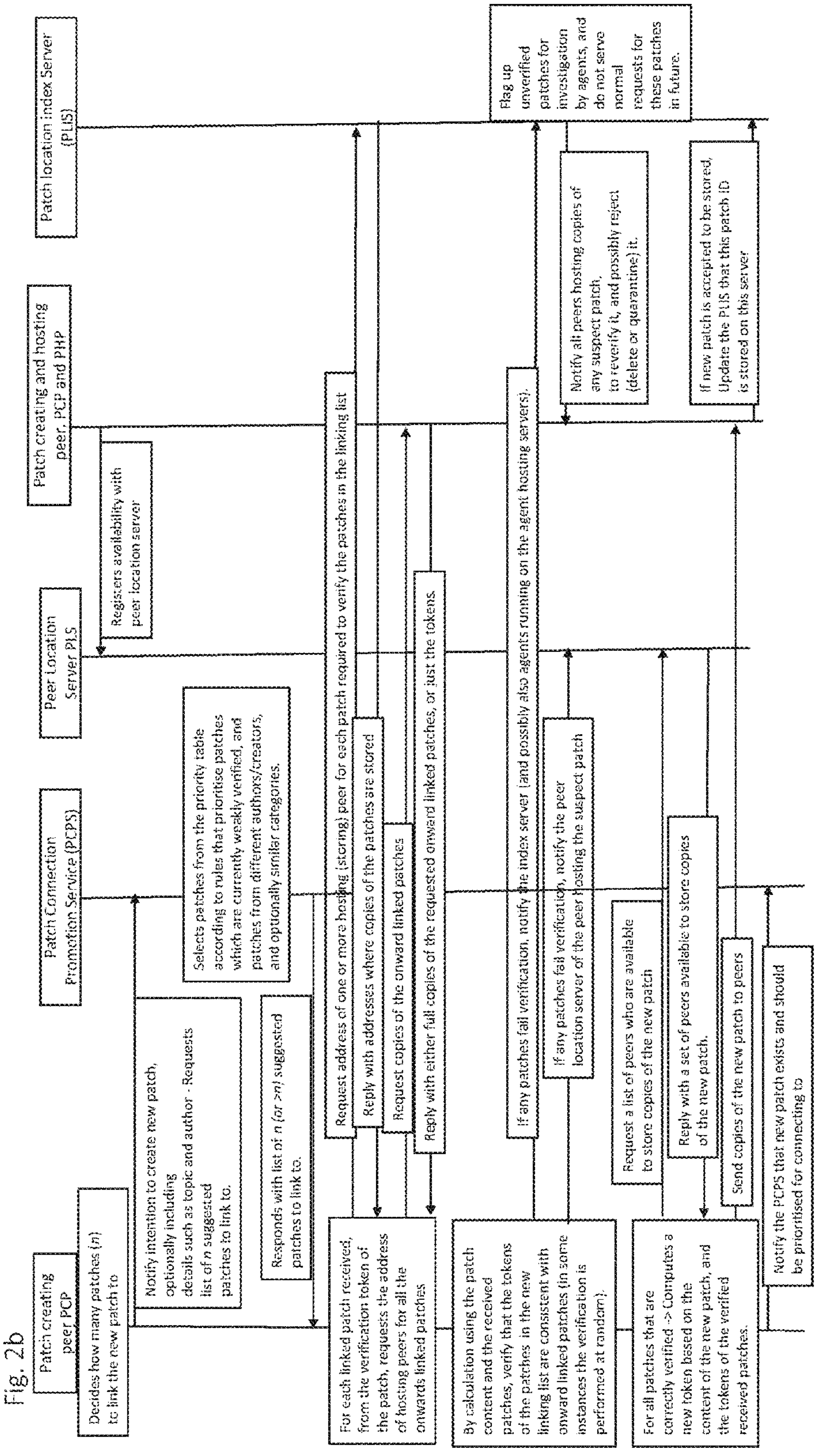

FIG. 2*b* shows another sequence diagram showing an alternative implementation of determining how many existing patches a new patch should connect to, and which existing patches to connect to, using the patch connection promotion service.

As shown in FIG. 4, a header of an XML,JSON or structured binary digital string or file, illustrating a patch, or digital asset string or file is shown. A digital signature of the peer 101 that created the cryptographic digest for this patch (this is in the creator field), and the strings that are in the patches field are the IDs of the existing patches which this patch is considered to be 'stitched' (cryptographically linked) onto. Of the existing patches listed, they are placed in a specific order and then the new patch (the patch that this header is corresponding to) is added to the existing patches, and then calculate the hash function of the result, and the result of the hash function is the stitch that stiches the new patch onto the existing patches, and then the result is a token that needs to be added to the header (it could equally go into a footer). When a new patch links to this patch (the patch having the header shown in FIG. 4), such new patch will want to include all of the header (or footer) containing this information when it calculates the new hash function for such new patch. This, in effect, is how the traceability is achieved, as to what happened in sequential time order, and this becomes checkable.

Figure 5:
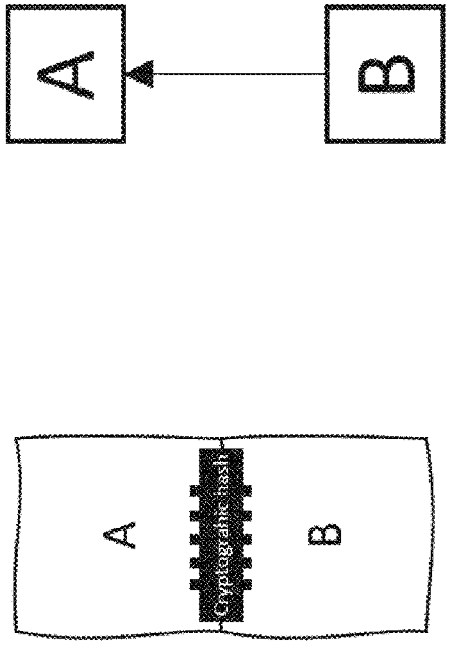
FIG. 5 shows a simple example of two patches (digital assets) being linked together cryptographically.

As shown in FIG. 5, a simplest example of two patches stitched together with a cryptographic hash is shown.

Figure 6:
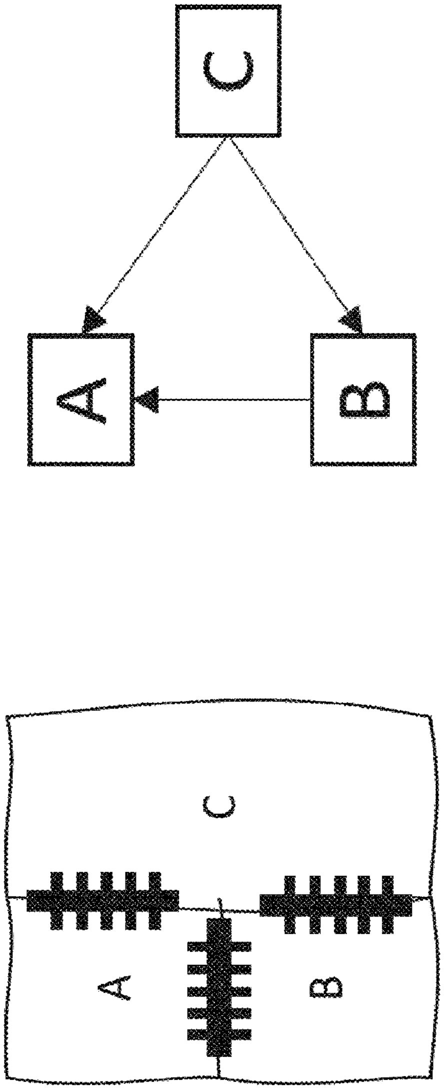
FIG. 6 shows another simple example of three patches being linked together cryptographically.

As shown in FIG. 6, an example of multiple patches stitched together in the repository, is provided.

Figure 7:
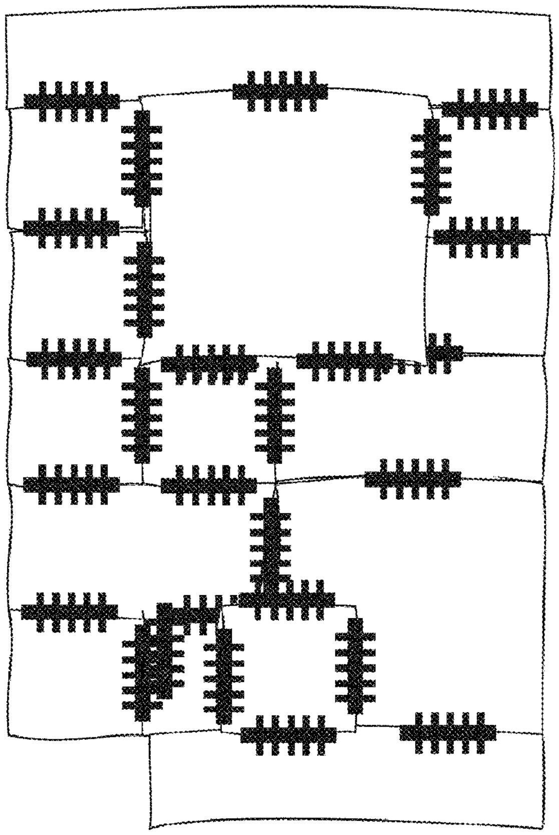
FIG. 7 shows an example of a more complex example of several patches being linked together cryptographically.

As shown in FIG. 7, a more complex patch example is provided.

Even though the patches in the above figures are laid out in two dimensions (because they are being shown on a flat page) the patches are being added to a decentralised peer-to-peer archive storage system (network), the connectivity between patches is a general directed graph with no limits on the degrees of connectivity, or dimensions, and is therefore not a planar graph.

In some embodiments, the content represented by the digital assets associated with the patches is software such as executable binaries, firmware, virtual machines or containers. This software may, for example, be a bespoke piece of software designed to implement a network function (i.e. network function virtualisation). A software publisher may act as, or make use of, a patch creator peer to register new software, or new version of software, as a patch. In some embodiments, the software binaries themselves may include tokens which reference other software binaries and may be checked.

In some embodiments, the content represented by each digital asset associated with a patch is a representation of a network device on a network, and preferably also the firmware version and/or software updates and virtual functions running on each such network device. Network devices register their presence on the network as new patches, that is representative of the unique ID of the network device (such as its unique network address, MAC address and/or a private/public key certificate.)

A virtualised network function implemented as a virtual machine or virtual container may contain a cryptographic token that references the content, and cryptographic tokens of, software elements that make up the virtualised network container. These software elements may further contain a cryptographic token that references the software libraries (and version) that are required by the software elements. All these entities may form patches (nodes) in a virtual digital hypergraph of links with verifiable checksums based on cryptographic functions which reinforce each other using the interconnection of the data structure. Agents may be used, as described elsewhere in this document, to check the cryptographic tokens against the elements that link to them, and notify elements of the system, or the system controller, of any anomalies. Agents, or other methods, as described herein, may further be used to identify weakly connected (verified) elements and to create additional cryptographic linking structures (as described herein) to improve the self-consistent verifiability (of intactness, or non-mutation, and of version control) of the whole network.

Network devices register new patches according to updates that they make to their software and firmware, and they preferably link them to the patch that is representative of the device ID. For example, a device such as a server, or network device such as a router, may register all installed software or updates by, for example, cryptographically linking them to a root patch, which may represent the network device ID. The network device may register its current state by creating a new version patch for its ID which links to the patches which represents the software installed.

Patches which represent virtual representations of network devices may also be cryptographically linked to other patches, in a manner which is representative of their connectivity in the network, or alternatively according to a random strategy. The purpose of linking together the representations of network devices is to provide detection of changes or notification of deletion of a device or any part of the network. In some embodiments there may be a registration of patches which are related to physical or virtual communication links (channels) between the network devices. For better diversity, the patch representing a first network element (i.e. device or element of a software or hardware network device or function), is cryptographically linked to patches representing other network elements that are not locally linked to the network element (via physical connections or direct virtual connections such as VPNs or IP tunnels); and also to network elements that are not owned/managed/controlled by the same group, e.g. they may be managed by different telecoms operators. This decentralises trust over the network and therefore can increase resilience of the shared information about the structure of the network, in a way that does not place too much trust in any one location or operator.

Optionally network devices may act as patch hosting peers, or they may connect to another system such as a control layer which hosts the patches.

It is apparent to the skilled person that the above-described technology could be applied to any unique data object. For example, the data object could be a non-fungible token (NFT). In this case, the repository/patchwork described above becomes a secure distributed store for the NFTs. Using defined consensus mechanisms, the repository/patchwork could also be used to conduct transactions on the stored objects. Specifically, consensus mechanisms can be built on top of the repository/patchwork. For example, an example of a consensus mechanism that can be built is that two or more patch creating peers can submit patches that record and report their transactions, i.e. their version of events, and the same peers can then choose to cryptographically link onto complementary records placed by the other participants in those transactions which are also (or have access to) patch creating peers, to signify that they accept the complementary description of the transactions, as recorded by the other peer(s). Further, the patch creating peers involved as different parties of a transaction may notify each other whenever they create a patch relevant to a transaction, and the peers will link onto that in a subsequent patch which has the consequence of signifying acknowledgement and acceptance of the transaction by the peer. Because other patch creating peers who are not involved in the transaction are also able to connect to (verify) the patches according to the methods described above (e.g. via the patch connection promotion service), the transactions are not dependent on the other interested parties to be verified, but whether or not the other interested parties have accepted these transactions can be detected according to whether they have connected to them. Commonly in a sequential transaction involving two or more parties, each party will wait for the other interested parties to connect to their new transaction, by responding with a connected patch which is at least an acknowledgement, but preferably also contains information relevant to the next stage of completing the transaction.

As described above, the selection of which specific existing patches a new patch should link to, is made using the types of strategies mentioned above. However, there may be situations where there is no good strategy available for linking new patches to existing patches in such a way that a new patch is not left isolated (once the new patch is added, few or no new patches link to it and thus the new patch is isolated and becomes weak/vulnerable to deletion or mutation), or situations where there is a need or desire for further security and traceability in the network. In such situations, the above-described repository/patchwork can be improved upon by using a special type of patch called an anchor patch, which shall now be described.

The patches described above are generally static, meaning their content does not change once they are created and added to the repository. An anchor patch, however, has dynamic content and is mutable (rather than immutable). An anchor patch provides stability to the structure by preventing patches from being weakly linked to the whole structure and also preventing fraudulent mutations by making it even more computationally difficult to find a consistent, undetectable way of mutating old records. Specifically, cryptographically linked data stores such as the repository described above work by including computational traces of the values of previous records within new records. In this way, the previous records cannot be mutated without creating inconsistencies with newer records, so this is detectable. However, there are potential vulnerabilities in this scheme because the scheme relies on a continuous stream of newer records/patches providing verification for older records/patches.

This vulnerability is particularly important in the repository structure described above, where there are no strict rules about which older patches/records are connected to by newer patches. The risk here is that a patch, even one that already is linked to by newer patches, may be fraudulently mutated (altered) in a way that is not detectable because it is possible to redefine the connections of the patch. In many implementations, where the patch defines the patches that is references to, it is even possible that an attacker might create additional new "auxiliary-fraudulent" patches crafted such that the fraudulently mutated patch can be reconnected to the new "auxiliary-fraudulent" patches and still generate the same token value that is used by onward patches. In this way, the mutation would still look consistent with newer patches, and be undetectable. This is a particularly strong problem for as long as the new patch is not well connected onto (verified) by other even newer standard patches.

Figure 16:
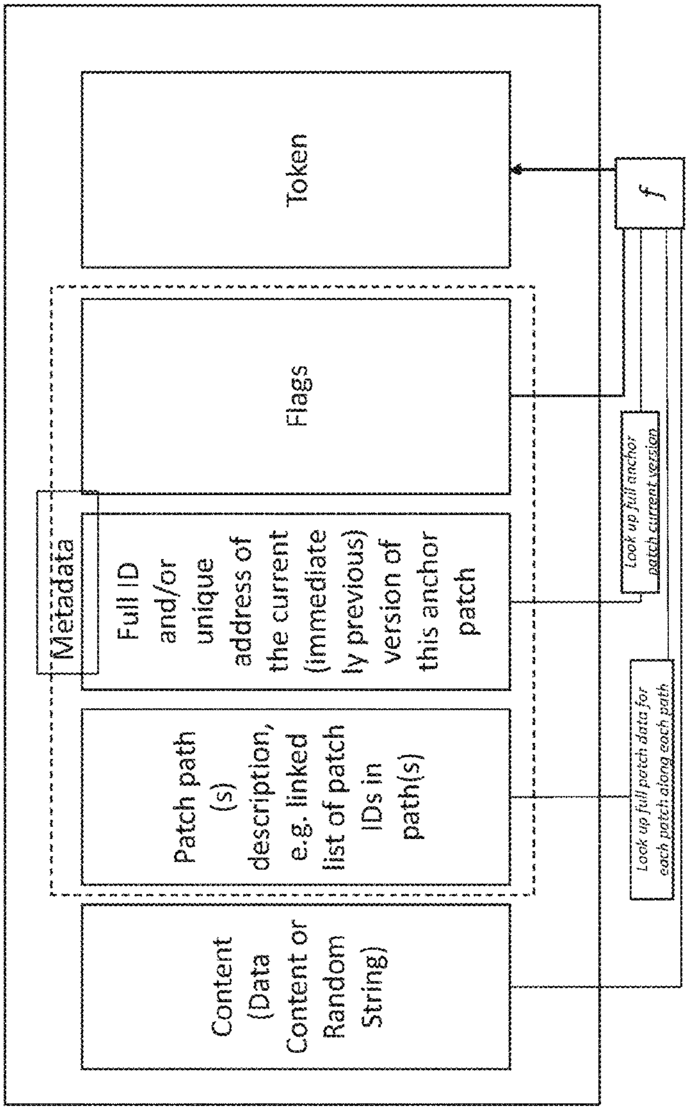
FIG. 16 is a block diagram showing the anchor patch structure according to a preferred embodiment.

In preferred implementations of the repository/patchwork described herein, this problem is mitigated by the fact that the new patches store the references (list of links) of previous patches as well as the cryptographic digest from previous patches, according to a standard format. In other implementations though, new patches may store only a function of the list of references, or they may only use the cryptographic token of the patch they connect to (rather than including, as a dependent argument to the hash function or other token calculating function, the reference list of the IDs of the linked patches of the linked patch (the second level indirection) when calculating the new patch token). In these implementations, anchor patches are particularly useful to mitigate the increased flexibility that any attacker would have to mutate the peer patches. Anchor patches calculate and store verification codes calculated from the patch tokens, and optionally patch contents, over complete paths over the network of patches, which they store together with a description of the path which is, for example, a list of the patch IDs, and which allows any third party to check the authentication codes. Anchor patches also have the ability to provide a 'return' connection to a new patch, because it is allowed (according to the rules of the decentralized/patchwork network) for patch creator peers to create new versions of anchor patches. Fields of the anchor patch are indicated in FIG. 16. These may be fixed length or delimited fields, depending on the implementation. The token for the next (updated) version of the anchor patch is calculated as a function of the new version content (if any), the path(s) descriptions, the full patch data along the path(s), the previous (current) version and the values of the flags field. Note that the Genesis version of an anchor patch will preferably mark a flag in the metadata to indicate that it is the Genesis version, and will not contain any previous version of the anchor patch, but will contain some initial paths, which may be selected by the Anchor patch in response to a request for connection to it by another patch (e.g. normal patch). See FIG. 16 which illustrates the anchor patch structure, as explained above.

Once a new patch is added, an anchor patch could connect directly onto the new patch, by calculating a new token for the anchor patch based on the value of the anchor patch and the value of the new patch token (including the patch ID), or the entire new patch content including its token. The new token is calculated according to the standard function applied in the implementation, for example would calculate the hash function of the dependent values (the linked patch, the old version of the anchor patch and the content of the new version of anchor patch), and the anchor patch then appends the resulting new token to the latest version of itself (the latest version of the anchor patch). In this way, the anchor patch creates a new version of itself, it can do this because, as stated above, an anchor patch is dynamic/mutable (each version is preferably immutable, but its contents can be added to/changed over time), because it is allowed to create new versions of itself (while old versions are immutable, and also retained by the network). This results in the anchor patch verifying the new patch and thereby vouching for the new patch, thus reducing the new patch's vulnerability (making the new patch less isolated).

However, there is a risk of the anchor patch becoming too powerful since a malicious party could change the new patch and then the anchor patch could also change accordingly. Accordingly, it is useful to have multiple verifications of all patches along paths between different anchor patches, with each anchor patch managed by a separate hosting peer. Further accordingly, an anchor patch decides to link to a new patch directly or via a path of older patches, but the anchor patch preferably forms a step-by-step path to another anchor patch hosted by a different hosting peer, and a bi-directional 'checksum' or digest token is calculated by both anchor patch hosting peers. The digest token is quite similar to the normal patch token, more precisely, it is a cryptographic seal which is a function of all the content and tokens along the path between the two anchor patches. Both anchor patches are typically created and updated at the patch creating peer which also hosts them, but each anchor patch is associated with a different patch creator peer, which is also preferably controlled by a different entity. This, accordingly, de-risks the trust issue with respect to the first anchor patch. Furthermore, there are typically multiple relationships of this type between pairs of anchor patches, which reinforce the verifications within the network of connected data patches.

Figure 8:
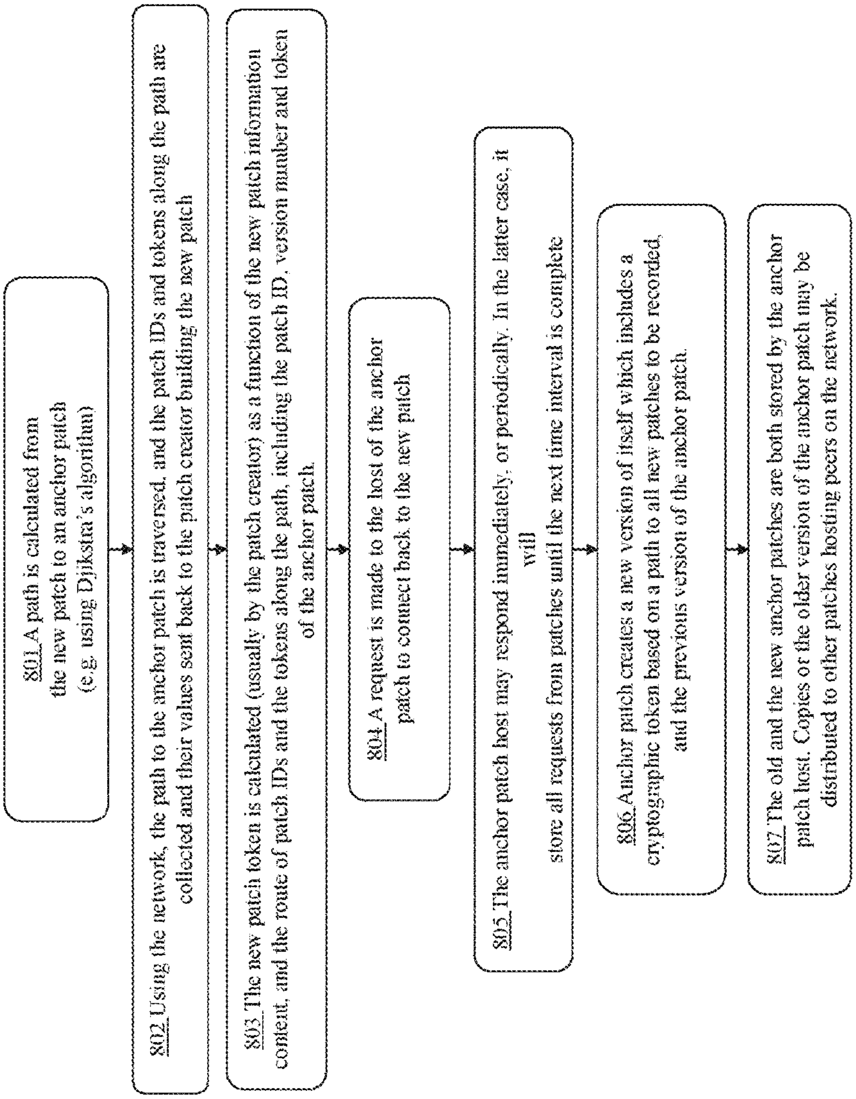
FIG. 8 is a flowchart showing steps in a method of using anchor patches with the decentralized storage archive, according to a preferred embodiment.
Figure 9:
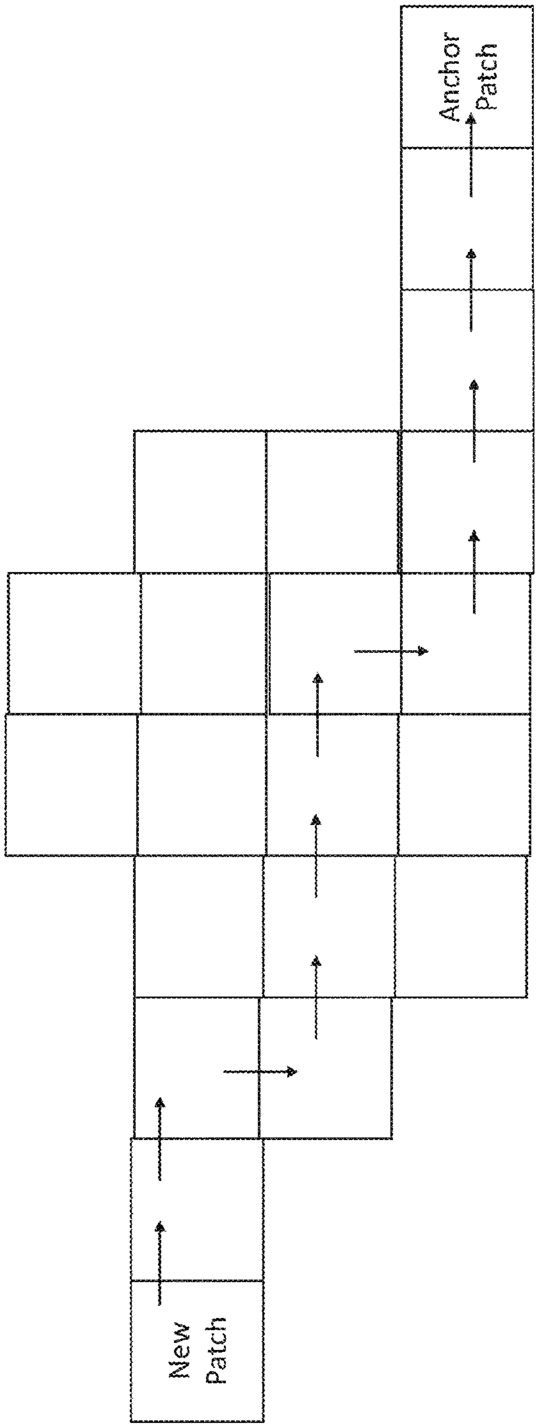
FIG. 9 is a diagram showing a path from a new patch to an anchor patch.

Turning to FIG. 8, the flowchart shown in FIG. 8 will now be described, to illustrate how anchor patches could work. When a new patch is being added to the repository by a peer 101, as shown in the flowchart of FIG. 8, at step 801, one of the n patches that the new patch could connect to, could be an anchor patch, and if this is the case, a path or paths is calculated (for example, using Djikstra's algorithm (an algorithm for finding the shortest paths between nodes in a graph) or by using k-shortest path routing) by the peer 101 from the new patch (see the diagram of FIG. 9) through the fabric (the path is passing through several patches) to the anchor patch as shown in FIG. 9.

At step 802, using the network, the path(s) from the new patch to the anchor patch is traversed by the peer 101 and the patch IDs and tokens (and optionally also content) from each patch along the calculated path(s) are collected at the peer 101.

At step 803, the new patch token is then calculated by the peer 101 as a function of the new patch's information content, the patch IDs from each of the patches in the calculated path(s), the tokens from each of the patches in the calculated path(s), and the version number and token of the anchor patch. The resultant new patch token is then sent by peer 101 to the peer hosting the anchor patch. The peer hosting the anchor patch is also made aware of the calculated path from the new patch to the anchor patch.

At step 804, a request is then made by peer 101 to the peer which is hosting the anchor patch, requesting that the anchor patch connect back to the new patch. At step 805, the peer hosting the anchor patch may respond immediately, or, periodically, and in the latter case, the peer hosting the anchor patch will store all requests from patches until the next time interval is complete.

Figure 10:
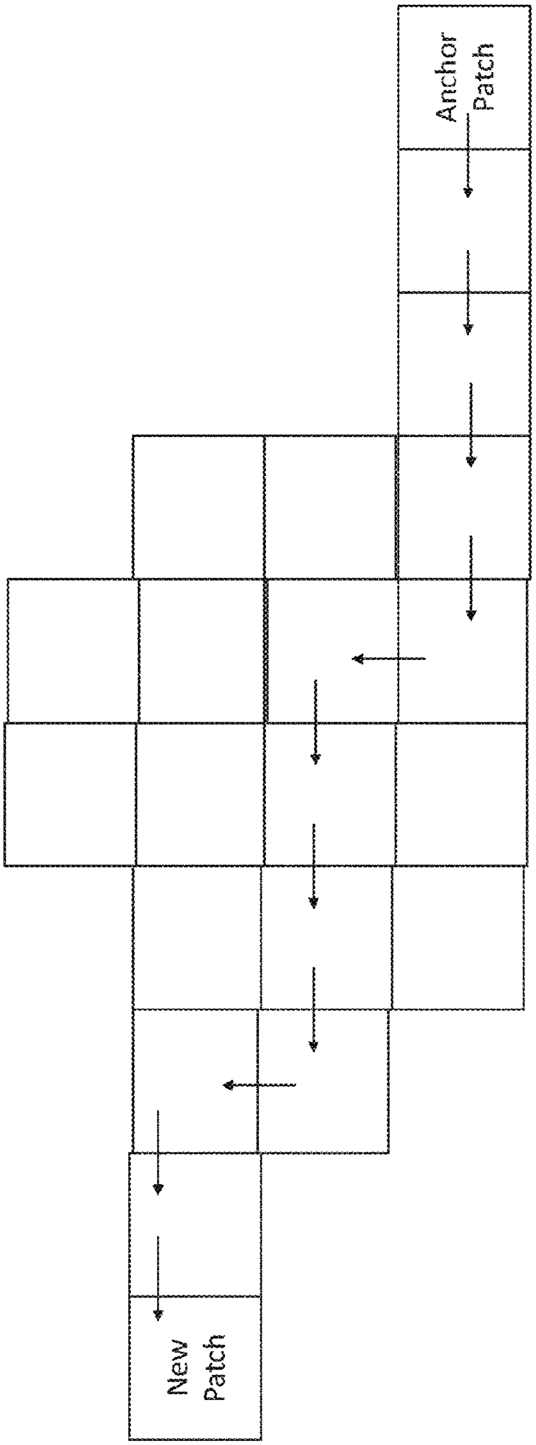
FIG. 10 is a diagram showing a path from an anchor patch to a new patch.

At step 806, the peer hosting the anchor patch then responds to the request to connect back to the new patch by creating a new version of the anchor patch which includes calculating a new cryptographic token (for the new version of the anchor patch) based on the path (see FIG. 10) to the new patch (e.g., the IDs and tokens of each patch in the path between the new patch and the anchor patch), the token of the new patch and the previous anchor patch token. If there are more new patches then the peer hosting the anchor patch does the same for each of the new patches and includes the corresponding information in the new version of the anchor patch.

At step 807, the old and new anchor patch versions are then both stored by the anchor patch host. Copies of the older version of the anchor patch may be distributed to other patches hosting peers on the network. For traceability, older versions of anchor patches are retained and referenced by a version ID as well as a patch ID. A new version of an anchor patch makes a cryptographic link to the previous version of the anchor patch, which is not deleted. In some implementations, different versions of an anchor patch may be hosted by different servers, i.e. the new version may be hosted at a different server than the previous version; while the old versions can be replicated to many servers. In other implementations, a given anchor patch is permanently linked to a given server (or a given host), and the current version of that patch as well as older versions will always be hosted there, though the older versions may also be replicated to other peers.

The flow chart of FIG. 8 is often carried out multiple times to create multiple paths to different anchor patches from the new patch, and, in some implementations the paths may not be simple paths, they may contain loops.

Also, in some implementation the token will contain a record of all the path and cryptographic calculation based on the tokens on all the paths; in other implementations a cryptographic calculation may be made on each separate path, so that the token has multiple elements.

Without the use of anchor patches, the new distributed repository described above, results in an acyclic graph (according to the principles of graph theory where a graph can be made of the links between the nodes/patches). Specifically, each new patch points to specific existing patches that the new patch is linking onto, but an existing patch cannot link to the new patch, and thus cannot close the circle which would then create a cyclic graph. However, with the use of anchor patches, the anchor patch can link to the new patch (and the new patch can link to the anchor patch), thus making a cyclic graph according to classical graph theory.

To make this process more efficient, preferably the anchor patch may (in some implementations) use a recursive function to calculate a new cryptotoken from a list, tree or graph structure of other patches. It is therefore able to update recursive functions along a path (for example) by extending the calculation to the new patch or patches added to the path. An example of such a recursive function is for each successive patch to be added to the calculation of the cryptographic seal along a path by taking the current value of the cryptographic seal, appending the value of the next patch along the path (i.e. the patch token and optionally also content), and then using the chosen function to calculate the new value of the cryptographic seal. This process is repeated until the path is complete. The initiating value of the cryptographic seal is typically the result of a string function, such as a cryptographic hash function, on the string describing the ID, content, and token of the previous version of the anchor patch itself. At some point e.g. the beginning or end (which should be clearly defined in the implementation) in the calculation of the cryptographic seal, the content of the new anchor patch version is also added to the calculation using the same recursive step. It is noted that the path along which this seal is calculated may be simple or complex (containing loops), and that traversing this path will typically involve queries to one or more patch location server, in order to resolve the cryptographic links between patches, and locate where the linked patches are hosted on the network. In some implementations, well known homomorphic hash functions may be used to make the recursive updates, but it is noted that this is not always preferred, as a normal hash function will provide the recursive function via forward hashing, and the special homomorphic hashing provides the ability to remove patches from a hash function easily, which can immensely improve computational efficiency of the system described here by allowing patches to start from the digest of neighbouring patches to calculate their own digest (token.) However, for the same reason, homomorphic could reduce the security provided by the network by rendering the computational expense to rearrange, mutate or delete patches lower. The decentralisation and replication of patches over multiple peers still provides integrity protection when homomorphic patching is applied, so the choice of using this function will depend whether computational efficiency (cost and speed) is a priority over maximising strength of security of the network to an ultimate degree. In many implementations/applications, the security offered by a homomorphic hash-based approach may be sufficient event though it is not maximal.

To make this process even more efficient, in some implementations the anchor patches store requests for connections until the next update time (which may be as often as milliseconds duration between updates.) At update time, the anchor patch calculates a new version and cryptographic token including paths which incorporate all of the new patches to be linked onto.

Digital signatures (e.g. based on public/private key certificates) may be used to digitally sign the versions (according to standard methods) of anchor patches to authenticate the creator of the each new anchor patch version.

The question of trust of the anchor patches (and the systems that host them) is also important. This can be addressed by allowing normal patches to link to anchor patches (referencing version ID linked to as well as patch ID). This enables the network to provide constant verification of the present and past versions (both existence and values) of the anchor patches. Anchor patches can also link to other anchor patches.

The version chain of anchor patches could themselves potentially fork, which would create a problem in consistency. Normally this problem is avoided because each anchor patch is associated with only one peer host, and therefore it is unlikely that a single host would create inconsistencies in the versioning. However, in some versions different versions of the anchor patches may be hosted by different peers, which creates a risk of forking. It is therefore preferable that other anchor patches should themselves reinforce their peer anchor patches (the correct chain). This is done by some of the anchor patches calculating and storing reinforcing (verifying) paths along the correct (accepted) version chain of other anchor patches. This process Is updated at regular intervals.

In some implementations, the decentralised storage network can be finalised, which is referred to herein as closing it. Anchor patches can be used to perform this closing function (i.e, declare all data stored within as compete, final and no more records can be added) by declaring themselves closed by setting a parameter within their structure, such as a CLOSED flag. Members of the network will not update anchor patch if it is marked as closed, so any entity attempting to create a new patch fraudulently would be able to attach it to the fabric/archive (by linking onto), but would not receive the reciprocation of any anchor patch attaching to it. Even if a fraudulent anchor patch or patches was also created, there will be no overlap between the collection of references between fraudulent anchor patches, and good (closed) anchor patches. Therefore, analysis (for example by the software (microservice) agents will enable discrimination of the good group and the fraudulently added groups.

Preferably, before closing a fabric/archive, each anchor patch will first create a new version that includes large numbers of references to normal patches. Typically, these may be all the references to other structured data units (e.g., patch or block) on one or more paths between the anchor patch and one or more other anchor patches. Such paths may be found using well known algorithms such as Djikstra's algorithm or k-shortest paths algorithm.

A trusted perimeter of anchor patches can be defined. To reinforce the verification of any new patch, a further new patch can be added that goes from the first new patch to the trusted perimeter, and a second patch from the trusted perimeter to the first new patch (or a single patch which holds cryptographic digests chained in both directions.) Then the perimeter patch is updated to hold a new digest that chains along a path that includes both the new patches and reaches the perimeter again via a further patch. Usually, this path will start at a perimeter patch (which could be the same perimeter patch as it terminates, if a loop is used.) The route of the chain is stored in the updated version of the perimeter patch.

Preferably only certain entities are trusted to store anchor patches. Preferably, the servers that are allowed to host dynamic anchor patches should be trusted through reputation; in other words this has to be earned by participants with a given history of active and honest participation.

Anchor patches can be distributed through the datastructure, they need not all be at the edges of the graph that describes the cryptographic links between patches.

When no new patches should be added, e.g., to end contributions to a meeting or to end a vote when all votes have been cast, then anchor patches can be used together with multiple paths to close and finalise the data structure. Then the anchor patches are frozen, so they cannot be further updated. This can be done by writing closure patches into the structure that contain derived cryptographic quantities that involve the final state of the anchor patches. Closure patches are marked with metadata, for example a flag in the headers. Closure patches are replicated to every member, such that in future any new patch that cannot be traced back to a closure patch will not be accepted by the network. In some implementations all closure patches are concatenated, and this is used to form a token that is recorded in a closure.

Disclosed above is a method for increasing the assurance of the integrity and completeness of a decentralised peer-to-peer storage network. The disclosed technology provides for a method by which, for example, storage units containing or associated with digital assets which are being added to a decentralised peer-to-peer storage network are verified by existing storage units containing or associated with digital assets (already stored on the network) as such new digital assets are being added, thus reducing the vulnerability of such newly added digital assets to, for example, malicious attack. The newly added storage units are vulnerable because no other existing storage units are yet cryptographically linked to the new storage unit (thereby verifying and vouching for the integrity and authenticity of) the new storage unit. In addition to this, the disclosed technology solves other problems associated with decentralised peer-to-peer storage networks, namely that the verifying links between records in some types of datastore can be at risk of becoming isolated as a fork or as a local subgraph or subnetwork, which are not high verified by a wider part of the linked, self-verifying datastore. In other words, some storage units containing or associated with digital assets may form a small subgroup within which most links are made to other members of the subgroup, and there may only be one link or a small number of links from this subgroup back to the wider group of storage units within the data store. This increases the risk of part of the datastore being weakly connected to other parts of the datastore, such that one part of the tree, graph or network representing the connections between the records can be entirely removed and optionally replaced with a new version, in a manner which is not easily detected by the rest of the network. When the intention is to provide a traceable, immutable and complete record of transactions or submitted assets, this is highly undesirable and could allow fraud. In some implementations, the disclosed technology provides a method and a specially designed data structure which provides strong resistance against this problem.

In the immediately following text, provided are some embodiment details and variations (of anchor units), which in most cases are explained in more detail elsewhere in this document. Anchor units (or anchors) are useful for increasing the stability, the integrity and the trust in decentralised cryptographic data stores. A decentralised cryptographic datastore contains storage units containing or associated with digital assets in records which contain strings derived from cryptographic hash functions (or similar digital functions which provide digital integrity checking, and optionally also authentication of the author) of other records internal or external to the datastore'.

The Structure of an Anchor

The anchor is a data-structure, which may include executable logic, and which consists of a cryptographically linked set of versions of the record representing the instance of the anchor. When initiated, a new anchor preferably consists of a genesis unit (digital record) which is the first version of the anchor. This contains, at minimum, a unique ID or address, and a version number for this anchor. An anchor may be stored in memory or a more long-term data storage medium. Although the use of new versions of any anchor allows the information in the current version of the anchor to be mutable, each version of the anchor is preferably and usually immutable, and so even a write once read many-times (WORM) physical medium is appropriate to store the anchor, and in some cases may be preferred to allow the anchor to be audited.

Hosting of the Anchors

In most embodiments, preferably each of the anchors is hosted on a separate anchor-host, which is normally running on a server (or group of servers). Each anchor-host is preferably controlled by a different organisation or individual. This has the effect of spreading trust and verification over an independent group of peers.

Inheritance and Anchors

Anchors consist of linked digital records, which we refer to as units (e.g. blocks or patches). These may inherit their digital structure from a template, which is a generic record that may be used as a starting point, and that contains data that is useful for initiating a new anchor, such as a set of rules or logic that are used to select which digital records to link onto.

The Use of More than One Anchor to Increase the Integrity Verification of a Digital Ledger or Datastore Preferably, more than one anchor may act to monitor the digital asset stores, and the monitoring anchors may also select records from other monitoring anchors, and create new records which traceably cryptographically link to the string representation of those, and verify that both the cryptographic checksums of the links made by (and optionally also onto) the other monitoring anchor patch, and the content of the patches that have been connected onto by the second anchor patch are correct, and also in order to endorse them.

Variation 1—Anchor(s) are a Highly Integrated Part of the Peer-to-Peer Datastore In some implementations, the anchor hosts are peers in the same network as the peers which create the digital records (such as blocks or patches) that are being verified and endorsed by the anchor hosts. This is the case for the anchor hosts that are defined (as an integral and preferable part) of the patch datastore described above. In the patch datastore, a new patch may first link onto a current version of an anchor patch, and secondly send a request to an anchor patch, requesting that it will connect to (i.e., link onto and provide traceable verification for) the new patch. The anchor patches and the standard patches are therefore highly interconnected. However, anchor patches are distinct from normal patches as they have a version code as well as an ID, and they update themselves by creating a new version which links to the previous version, as well as normal patches. In addition, anchors preferably connect to complete 'paths' i.e. walks over locally linked normal patches to new patches or to other anchor patches, and secondly they can and typically do operate using a different (and more complex) set of connection and verification rules than the normal patches, for example they may provide a deeper level of verification before linking onto a patch to endorse it. Thirdly, the anchor patches have a higher level of cooperation with software agents, for example notifying them when inconsistencies are found, and providing the paths which are walked by the software agents when they run verification checks of integrity and completeness. (Agents typically check that the whole path is consistent with the checksum for the path that is encoded in anchor version, but may also deviate slightly from the path and check local link checksums are also consistent.) Agents may also communicate with anchor patches to alert them of isolated or weakly connected and verified patches that should preferably be connected together in a new single path, in order to reinforce integrity checking across parts of the graph that represents the connections in the datastore that are currently lacking in direct connectivity, and so run the risk of being separated with no or few detectable integrity checksum violations.

In some implementations, all patch creating peers may take the role of anchor hosts.

Reciprocation:

In some implementations, a first ledger may contain anchor hosts which act as an anchor to a second ledger, which reciprocates by providing anchor hosts which act as an anchor to the first ledger.

Variation 2—Separation of the Anchor(s) from the Datastore(s) (Digital Ledger(s) or Store(s)) Being Verified and Reinforced by the Anchor(s)

However, in other implementations, the anchor hosts may have some degree of separation from the peers that host the records of the datastore being strengthened by the anchors. For example, the anchor hosts may be able to read copies of the digital units, and therefore can form links that point to them and that contain cryptographic checksums which are a function of their value, but beyond that the datastore being verified does not need to be aware of the anchors or their value, and in this variation of an embodiment the datastore does not link onto them. Instances of anchors may, and preferably will, still verify and link to each other.

Use of a No-SQL Database to Store the Digital Assets

In some embodiments the digital assets representing the anchor, and other data structures associated with the ledger, may be stored in a No-SQL database. The No-SQL database is very suitable for hosting the connected directed graph(s) associated with the verification links between patches. An additional software layer, within the software running at the peers and optionally also encoded in the software and rules encoded within the patches themselves, will provide the additional required functionality required for the anchor functionality, such as selecting or rejecting which patches to link onto, and performing cryptographic calculations and verifications.

Accordingly, an entity (anchor-host, or auxiliary function to the anchor-host) monitors a first decentralised digital asset store and, selects parts of the cryptographically linked ledgers to endorse, and, creates new digital records which are traceably, verifiably linked to the entity doing the monitoring, and the endorsed records selected from the first decentralised digital asset store, where the new digital records created by the anchor are also traceably verifiably linked to previous versions of digital records held at the anchor. The traceable, verifiable links between records involve algorithms that involve discrete mathematical functions such as cryptographic hash functions of the string (e.g. binary or ascii string) representation of all of the linked entities. The monitoring entities may define a path along existing cryptographic links and create a new version of an anchor which links to all digital records along this path. The path defined may be a complex path with loops, or a multipath (subgraph) of connections between the source and destination patch. Software agents may monitor the links between the digital assets/records and send notifications to monitoring entities of new digital assets/records that are not strongly linked to.

As was illustrated above, multiple anchor storage patches can work together to peer review each other and only connecting to each other if they endorse each other's claims.

Also, in some implementations, an anchor patch (consisting of a cryptographic unit which is linked both to previous versions of itself and to the newest (and/or most weakly connected/verified) can be linked to units on more than one cryptographic ledger or datastore. For example, some number of distinct blockchains may each be reinforced by one anchor patch (which has multiple versions).

Preferably there are many anchor patch hosted at different peers which are controlled by different entities.

The anchor patches may provide connections (cryptographic verifications) to versions of other anchor patches when they have parsed their content and accepted their version of events (the veracity or consistency of the assertions made within the content) as well as the cryptographic integrity of the prior linkages. This provides a method for anchor patches to endorse the actions of other anchor patches. Rogue or faulty anchor patches, which do not connect to the main branch or subgraph of the cryptographic ledger(s) being reinforced, will not be connected onto by other anchor patches. Versions of the rogue anchor patch will be advertised in the network for connection to, but when the other anchor patches parse their contents and claims, they will be rejected for connection to, as was illustrated above in the figures. Therefore, rogue anchor patches will become isolated and will not be connected to.

Where a first anchor patch is performing a peer review of a second anchor patch, the peer hosting computing system hosting the first anchor patch checks two things regarding the second anchor patch: 1) whether the claims made by the second anchor patch are endorsed or agreed with by the first anchor patch, and 2) checking the cryptographic integrity of the second anchor patch.

For example, a first anchor patch host that hosts the patch of a first anchor patch requests a copy of a second unit, which is part of (e.g. the latest version of), a second anchor patch from a second anchor patch host, and reads the content of the second anchor patch, and first checks any part of the checksum token of the second patch which is dependent on the content string of the second patch, and checks that it is self-consistent (and aborts if it is not, optionally notifying one or more agents or servers of the inconsistency); it then further requests the list of other third patches that the second patch connects onto (this is normally encoded within the second patch) It then iterates through the list of third patches, and checks that the third patches are all contained within the version of the distributed ledger that is trusted (i.e. is hosted on the majority of most trusted peers, or equivalently is the dominant fork in the blockchain, or the dominant fabric—that is, the largest consistent subgraph, or the subgraph hosted on the most trusted peers, or a weighted combination of those two factors—in a cryptographically linked digital graph or hypergraph.) In some implementations it may also check that the content of those third patches is valid according to other information accessible to the anchor-patch host, for example it may use higher order logic, formal verification methods, or other principles, to compare any assertions (such as the assertion of the transfer of something, for example money or software, which is reciprocated by two or more parties in a sent and received statement) made in the content of these third patches. If the first anchor-patch host finds that the checks of all the third patches connected onto by the second unit are satisfactory, it then creates a new version of the first anchor-patch which is linked to the previous version of the first anchor patch, and the current second anchor-patch, also any additional patches/units or anchor patches that it has deemed to be satisfactory in this round of verifications. In doing so this constitutes an endorsement of the second anchor patch by the first anchor patch.

Agents (which are described further herein) may be used to analyse the connectivity of the anchor patches, and to identify potentially Rogue anchor patches.

After a period of employing verification/discrimination algorithms or a referral of the evidence for human decision making, suspected rogue anchor patches may be blocked from the network, or deprioritised in the connection advertisement services.

An example methodology will now be described regarding the anchor method described above.

An anchor patch hosting peer first connects to the data storage network and optionally identifies one or more versions of the network. If there is more than one version of the network identified, the anchor patch hosting peer selects the version hosted on the most peers, where the calculation of 'most peers' may be weighted by the trust of the peers.

The anchor patch hosting peer optionally requests one or more other anchor patches from other anchor patch hosting peers, e.g., using the patch promotion services. The other anchor patches returned are usually recent or latest versions of those anchor patches. The anchor hosting peer performs checks of cryptographic tokens of the new patches both from the network it is verifying, and from the other anchor patches it connects to, including the current version of itself, which it is updating.

The anchor hosting peer also performs checks on the claims made in the content of the other anchor patches it connects to, e.g., the networks that are connected to (endorsed). If the anchor hosting peer agrees (e.g., finds it in agreement with the anchor patch that is hosted there), then it keeps these patches for connection to. If it does not agree, then it does not connect to these patches.

The anchor hosting peer forms a new version of the anchor patch which contains both a reference to (e.g. a list of IDs/versions) and a cryptographic token based on the value of all the patches it links to/endorses and the value of the previous version of the anchor patch.

In the above discussion, a patch is described as a unit of information to be stored in a storage network of the type that was described in detail above, where the patch may be fixed length or structured, and which contains one or more cryptographic tokens within it which are mathematically linked (e.g. by a hash function) to the values of other patches. Preferably patches have a unique ID or address. A patch can be uniquely referenced, identified and retrieved, as was describe above.

In the above discussion, an anchor patch is a type of storage unit which can have special fields or other properties which identify it as an anchor patch, one of these fields being a version number as well as an ID. According to the rules of the storage system, the anchor patch may create a new version of itself, which normally contains the full content of the previous version of the anchor patch as well as new content, and is cryptographically linked to the previous version of the anchor patch. Preferably the new version of the anchor patch is also cryptographically linked to other, distinct anchor patches (not previous versions of the current anchor patch, but the latest version of a separate anchor patch). The role of anchor patches is to reinforce the cryptographic integrity of the datastore, which is usually decentralised, by linking onto new patches, and, for example, providing the service of linking to weakly linked new units on request in data structures for which all new units should be accepted (such as the data structure described in detail above regarding patches), and also, where appropriate, providing long range checksums that cover widely separated parts of the datastore, and ensure that it is not possible for any entity to gain control of a small subset that is weakly connected to the rest of the records, and undetectably alter or delete content within that subgroup. This is prevented because the anchors firstly accept requests to connect onto and provide verification of new patches in the datastore, and secondly the anchors may connect onto and provide verification of many existing patches that traverse complete paths of local verifying links between those units, usually traversing from one anchor patch to another, and thirdly because the anchors are preferably hosted at peers who have a relatively high trust rating from the rest of the network, so the role of the anchors in peer review of the datastore is accepted by other peers.

It is preferable that multiple anchor patch peer hosts perform the role of peer review of each other by linking to each other's endorsements if they further agree and endorse them. In a simple example, a first anchor host may use rules defined within the current version of the anchor patch, or otherwise configured at the first anchor host, to accept or reject the decision to make a verifying link to a current version of a second anchor (i.e. the digital record that contains the details of links, verification checksums and any other content of the latest version of a second anchor), based on whether all the other patches that the second anchor patch connects to: firstly are consistent with the checksum(s) on the second anchor patch; and, secondly, in some implementations, that the other patches contain content which is acceptable according to the rules at the first anchor host. The rules for accepting content may include checking that the content does or does not fit into some category (e.g. "Music file"), and may also include checking that the content of all linked patches are consistent, both with each other, and also, optionally, with an external source such as a knowledge store. In some implementations, the verification may be performed only at random intervals, to provide auditing, but to reduce the burden of computational processing.

In a further modification of the technology described above, rather than the peer computing system hosting the anchor patch containing the relevant logic, the anchor patch can contain the executable decision making logic that sets the rules of connection and endorsement. In fact, this can be the case for both anchor patches, and, for the new decentralised storage network involving patches described in detail above, for patches which are not anchor patches (i.e., for normal patches). This will now be described just below.

In some implementations the final decisions about whether and how to make connections onto other patches is made by the patch creator peer, or the anchor-hosting peer if this is an anchor patch.

However, in other implementations, the decision-making program (logic or executable software program) for ranking other patches or units for connection onto, or for accepting or rejecting patches for connecting onto, is contained within the patch itself. Other aspects of the process may also be encoded as a program within the patch, for example, the verification logic or executable program. According to this embodiment variation, for the anchor patch, these rules/program are contained within the previous, most current version of the anchor patch. For a normal patch, it inherits its rules from a parent patch, which may be stored in a library as a default template that the patch creator peer starts from.

The advantage of containing the decision and connection policy/code within the patch is that it may allow different types of rules for different patches to be easily handled by the peer system. For example, some patches may have a requirement to connect to larger numbers of other patches, or to verify each patch that it accepts to a second or third level of indirection (verifying the parent and grandparent patches of the patch being connected onto). In some embodiments this is compatible with a variable cost for being verified charged to a patch creating peer, or the reward provided to a patch creating peer or anchor host for connecting onto or verifying onto other patches. This embodiment also supports the flexibility for certain patch creator peers who can access a higher computational power to make a choice of patch template to match the computational demand associated with the rules of that patch template, therefore earning a higher reward from providing a larger number of verifications. The decision logic encoded within the unit/patch is processed by the compute resources at the peers, e.g. by the patch creating peer.

In some versions the patch may contain the code to activate mutation or deletion of itself and/or other patches if certain consistency checks over the cryptographic digital hypergraph are not met. This may also include activating the 'mending processes' of the agents described elsewhere in this document.

Once the patches are stored in the decentralised repository, where a particular patch (asset) is required to be located, a search would need to be conducted to look for the patch of interest. Many different search techniques exist for searching other (existing) distributed peer architectures (such as the World Wide Web, or BitTorrent), and any of these known search techniques could be applied to the new digital store described here. Some of these search techniques will now be described, in the context of implementations of the above-described patchwork/archive network. One well known algorithm for searching graphs is called "Depth-first search", it is used to traverse a tree or graph data structure, and could be used.

It will be apparent that there are many different ways in which the patches might be searched, both by people using the archive network who are looking up transactions, and by agents.

A first problem is the question of uniqueness of the patch IDs. We note that there are many possible straightforward mechanisms to resolve this problem and ensure uniqueness. One possible method is for each new patch ID to include a new string (e.g., randomly generated or chosen as a hash function of part of the patch content), plus the appendage of the unique address of the patch creating peer and the current datetime string.

Finding patches is helped by the presence of patch location servers. Patch hosting peers register with the patch location index servers (PLISs) and report (and update) the patches that they host; this is stored in a suitable data structure such as a lookup table at each patch location index server, typically looking up (by patch ID) the address of one or more patch hosting peers that have a copy of the patch.

One aspect in which agents (which will be discussed below) are very important, is in updating data structures at the PLISs that keep track of the connections between the patches, and where these patches are hosted. As well as the lookup tables between patch ID and PHPs that host the patch, which are always present at the PLISs, it is helpful if these servers also host lookups from each patch to the IDs of other patches that connect onto them, and the IDs of patches that the path connects onto. The data structures that are used to host this information may be representations of the network, such as noSQL structures based on pointers, or they may be lookup tables in which the first column (indexed) is patch ID, and the second column is a list or set of linked patch IDs. As the agents traverse the patchwork fabric following the links between patches (and using the PLISs to help them find the hosts on which the patches are stored), they should update these structures in both directions (i.e., they should update the lookup between patches that connect onto (verify) the current patch; and also the lookup for patches that are connected onto by (verified by) the current patch.)

Option 1: The lookup tables are hosted at the PLISs, but this is only a semi-centralised solution to organising the patches, because there are multiple PLISs, preferably owned and managed by different people or organisations, and not all PLISs necessarily contain the same information. An entity that participates in the archive network may contact multiple PLISs in order to resolve the location of a patch, given its patch ID.

As the patch hosting peers (PHPs) send (replicate) patches to other PHPs, the PLISs are updated to contain the new addresses of the receiving PHPs as well as the originating PHPs as hosts for that patch.

Preference for reliable patch hosting peers: A PLIS may hold several options for the hosts of any given patch. In some implementations, the agents will update the PLIS with the reliability of the different hosts, based on the elapsed time since the entry was updated, and other parameters such as the reputation of the hosting server for being online and having bandwidth (and even type of IP address, e.g., class B, C or the type of organisation that owns the IP address). The PLIS will return with highest priority/confidence, the most reliable and trusted host for the patch with the queried patch ID.

Localisation of the PLIS coverage: In some implementations, each PLIS will maintain the lookup index of patches hosted only on a subset of all the patch hosting peers (PHPs). This subset may be chosen according to the locality of the PHPs to the PLIS, for example they are within a certain round trip time on the network or are on the same segment of the network. Alternatively, the subset may be chosen according to a topic or category of patches that are hosted by the patch hosting peers. When the PLISs are localised in this way, it is often preferable that the pattern of replication across patch hosting peers is also localised, so that patch hosting peers replicate to other PHPs in the same PLIS group or groups. This helps to improve the efficiency of patch replication and lookup on the network, at some cost to resilience.

Distributing patches across the PHPs in a resilient manner: Alternatively, in some implementations, the rules may be the opposite to those described in the preceding section, and favour replication across PHPs that belong to different PLIS groups, therefore increasing resilience of the patch hosting on the network.

In many implementations, patches are preferably distributed across the PHPs according to rules which ensure very high resilience. This is achieved by selecting replication of patches between the PHPs such that the network representing the cryptographic links in the fabric is quite different in connectivity to the network of connections between the patch hosting peers that replicate to each other, which also is selected to be distinctly different to the network of connections between the servers that host the patch hosting peers (both in terms of physical and geographical connections, and also organisational ownership connections). In other words, replicating a patch from a first PHP to a second PHP is more likely if the second PHP is not managed by the same person or organisation as the first PHP, and also if the second PHP does not hold patches (or does not hold many patches) which are cryptographically directly linked to the current patch, and also (in some implementations) if the second PHP is not on the same section of physical or geographical network/location as the first PHP.

Logically, this approach can be implemented as follows:

1. A first PHP has a patch that it decides to replicate (typically because it is notified by a PLIS that there are few hosts for the current patch.)
2. The first PHP receives a set of suitable second PHPs from the PeerLS (Peer Location Server) which have been preselected to be controlled by a different organisation or individual than the first PHP, and to be in a different geographical location (or a range of geographical locations, if possible.)
3. The first PHP establishes the ID of all patches that link to the current patch. It tests each of the second PHPs in the received set and checks with the PLIS whether any of the patches that link to the current patch are hosted at this PLIS. According to the number of direct patch fabric connections, the first PHP is less likely to replicate the patch to the second PHP. Some implementations may also consider next nearest neighbour connections in this selection process.

Assigning Routable Addresses to Patches, as Part of the Patch ID

In some implementations each patch may be assigned a routable address, such as an IPv6 address or another type of routable, unique network address. This may form part of the patch ID and may be assigned by the first PLIS to register the patch at the time of patch creation and establishment of the patch at its first host. Where addresses are used, the patches may use these addresses to form and to efficiently traverse the paths across the network of the patchwork fabric itself that are used by anchor patches. This is a form of network virtualisation, as the virtual network is the network of verifying connections between patches.

When the digital store is first being created, a new instance of the peer-to-peer storage network is provided with dummy patches which are randomly generated by the network, provided with digital IDs and random content with high entropy, and then, distributed to the existing peers in a random way so that on average there are x replications of each patch and also the location of each patch is provided to the index server as the patches are being distributed to the peers.

As was mentioned above, the decentralized storage archive, made up of patches, described above, can be improved by the use of distributed software agents, which run on servers and logically crawl between patches along pointers (and alternatively via lookup servers). They might also spawn new agents at some patches, so each could crawl in different directions. The agents could be used to test, validate and update the growing decentralized storage archive. The agents can be configured to run consistently and to test for alterations, management opportunities or repairs required in the underlying storage archive.

Specifically, these agents can be used to manage and correct flaws in the patchwork/archive that can occur, such as the following:

A. Patches (or more generally, units) not adequately replicated

B. Patches (or more generally, units) contain invalid signatures/chaining digests (fraudulently or due to a software error)

C. Holes or rips in the fabric could occur where one or more invalid patches (or more generally, units) are created and new patches link onto those.

D. Missing patches which are linked to but cannot be found on any patch hosting peers (or on the patch hosting peers that they should be hosted on, according to the PLIS(s).)

E. Inadequately replicated patches which have low resilience to loss from the network.

F. Missing patch hosting peers (or other peers) which are referenced by other peers but cannot be contacted.

Software agents can help resolve the above flaws by:

- requesting replication to member servers of patches that are not found in several redundant locations (or alternatively a sufficient score for locations weighted by known stability);
- requesting deletion or quarantine, for forensic investigation, of potentially invalid patches (which are recognised as potentially invalid because some or all of the patches that link to them contain a token which does not match the token that is computed); and
- where apparently genuine patches have linked to invalid patches, write 'mend' patches between good patches on both sides of the 'rip' which reinstate the integrity (numerical correctness of the cryptographic of the archive/fabric, while allowing the apparently fraudulent patches (with inconsistent digests that do not chain) to be deleted, or preferably, to be encapsulated in new patches.

As a common motivation of implementing the network is to provide full historical traceability it will usually be preferable that full deletion is not possible, and instead a suspicious patch is removed, encapsulated entirely in a new patch together with an appended string describing the reason for the removal (e.g. invalid cryptographic verification tokens on other patches that link to this patch), and reattached as a new patch. This act could be carried out by a software agent, or the software agent could direct a patch creating peer to assist in this process. However, removing a patch will not solve the problem that the other patches will now have invalid tokens, because they link to a patch which contains a mutated value. To resolve this, typically the network of patch hosting peers will first be searched to find valid copies of the original patch; if these are found, they will be replicate across some of the patch hosting peers to ensure that all incorrect copies are replaced by correct copies. However, if they are not found then a strategy is required to 'mend' the inconsistency that is created by having a missing patch, and record the missing patch. One way of solving this is to create a special 'mend' patch which has the same ID as the original patch, but is marked, by flags or other metadata within the patch structure, as a mend patch. In this special circumstance, all patches which already link to the invalid patch must remain in the fabric, to support other patches which may reference them, but may no longer be useful for the verification they provide, because the cryptographic token on these patches is no longer the correct result of the function of all the patches it links to, because one of those patches has now changed. In some implementations, this is solved by allowing the mended patch to keep its original token value if this is known, restoring consistency for all patches that linked onto the mended patch, even though the mended patch may not be self-consistent (which is tolerated as the patch is marked as mended in the metadata). Where the original patch token is not known, then all patches that link to that patch must also be marked using a flag that can be set as mended, which triggers the inconsistency in the patch token for all patches that link to that patch to be tolerated, according to the rules of the implementation. Additional steps may also be triggered, typically encapsulation of the mended patches as new patches (to reverify their content) and possibly triggering of additional connection to all patches within a small number of cryptographic link 'hops' from the original match, particularly promoting connections from patch creator peers which are widely separated in terms of ownership and geography from the patches which are detected as needing to be 'mended'. In some implementations, the method used for calculating a token for a patch is to separately calculate the hash function (or other function) of each linked patch, and then to append all of these values together according to the order in which the links to the patches is listed within the metadata of the new patch, and finally to append the result of the hash function (or other chosen function of the implementation). In this implementation, the token may be separated into parts which are each dependent on different linked onto patches. However, even in this case, it is not possible to alter just one linked onto patch without changing the overall value of the patch token in a way that is difficult to recompute, because part of the token of the patch is usually and preferably a 'self consistent' calculation based on the entire content of the new patch, including any previous part of the token, or if it is not, then a hash value of the entire content of the new patch will be made when it is linked onto. It is of course desirable that the network is difficult to change (and to mend) without detection.

The agents are configured to run, for example, consistently, to test for alterations to, and to manage and repair, the decentralized storage system. For example, the software agents can monitor the decentralized store for alterations or damage, such as storage blocks or units which have false values for cryptographic digests. Once identified (the verification sums on onward patches are not correct), the agents could then either reject them, remove them off the patch hosting peer and all copies of it which are similarly mutated, or prevent any new blocks (units) from attaching to them or encapsulate faulty/inconsistent regions. Agents would look at the time history of what was added, and then make a valid judgement on which patch has become mutated when it shouldn't have, and which patches need to be put into a quarantine so that no further patches can connect to them, and so that any information accorded from those patches is marked as suspicious, and then optionally perform the mending algorithms described in the preceding paragraph.

Ideally, if someone edits or double entries two versions of the same patch with the same ID it creates a rip in the tapestry (the checksums aren't right when you check them, and if there are groups of patches that don't compute compared to other patches then you would find a breakdown in the verifiability across the patches, so these needs to be identified by the agents. In the standard implementation, any patch can be verified as long as you have access to all neighbours that the patch digest is derived from (pre-existing neighbours). We can store multiple digests on each patch, some derived from single neighbours (as in blockchain) and some from pairs and some for larger groups and one from all pre-existing neighbours. This gives multiple digests for new patches to link onto (by calculating a cryptographic function which may be the result of a hash function of the neighbour values and the current value or the solution to an 'puzzle' or equation which involves the neighbour values and the current value), and some variation as to the cryptographic puzzle each new patch can be asked to solve.

The agents can be hosted on any server belonging to a peer member of the peer-to-peer decentralized archive storage instance.

Figure 11:
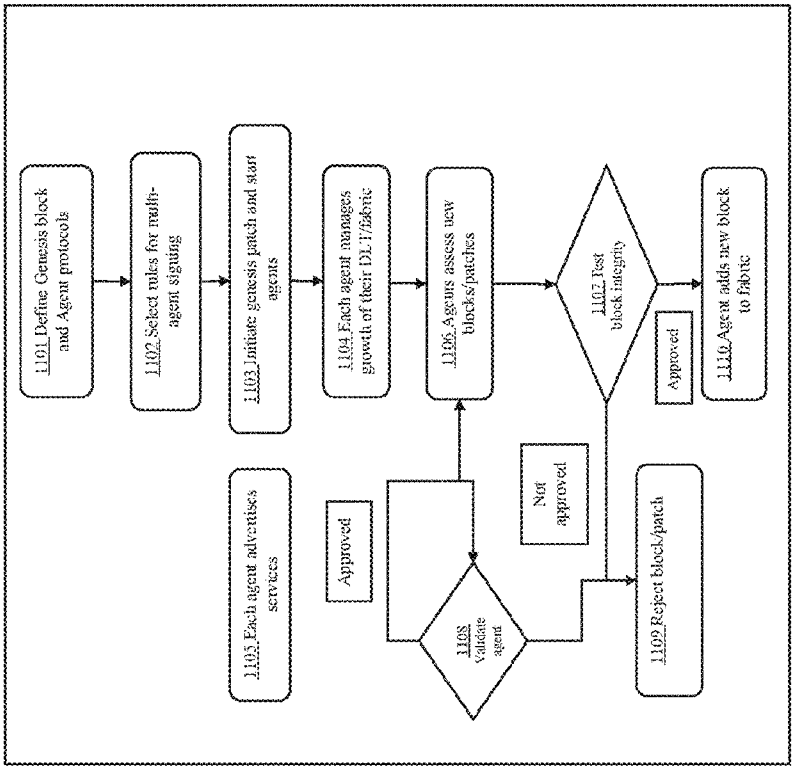
FIG. 11 is a flowchart showing steps involved in applying software agents to a decentralized peer-to-peer storage archive, according to a preferred embodiment.

As shown in FIG. 11, at step 1101, the distributed archive storage is at the very beginning of its population with digital assets (no digital assets have yet been added), and the system of agents first has to define the particular Genesis block and agent protocols, meaning that the system of agents define the type of distributed peer storage architecture that the system of agents is going to be applied to (in this case, it would be the patch/archive architecture described above) and the specific agent protocols which the agents should follow (software agents and their respective protocols are well known, and specific known protocols/rules for the agents are selected from amongst known agent protocols). At step 1102, the protocols/rules are selected, including, for example, is single signing by one agent permitted or is counter signing by multiple (e.g. n agents) agents to be required (this is a choice of a signing mechanism which is to be used). The specific agent protocols that are selected may be adjusted to optimise either security of the storage network or resource efficiency. At step 1103, the initial (genesis) patches are initiated, and the first set of agents is started up (booted up) and run within virtual machines on each server computer (or on a plurality of virtual machines on a single server computer).

At the start of a new digital hyper-patchwork, blockchain (or decentralised architecture), the Genesis block may also contain the complete code, or set of rules, for agents that may then interact with that chain. Separate applications may then have distinct and specific agent types associated with that application. No other agent type would be able to modify or add blocks to that chain. For example, agents may be labelled as associated with a specific web service, or as members of a specific group, e.g., NFT sales. The label would include a full digital certificate for identity purposes, as well as public key details on what the agent may sign. The aim is to allow multiple distinct agent applications to operate in parallel.

The agent network may be configured in multiple forms. For example, agents may be assigned to every server running the blockchain (or other decentralised storage architecture), or only to a smaller subset of more secure servers. It would be an application dependent choice based on the computational load versus security requirements. A finer grained distribution increases local control of the block process, but increases the compute load, while a coarse-grained distribution reduces the compute load, but increases the messaging requirements. It also concentrates agent operation on fewer servers, which may not be completely trusted by all parties in the blockchain/decentralized storage architecture.

Another design factor is the extent of each agents sensing ability, i.e., can they see (i.e., are able to manage) all blocks (units or patches) or only a local subset of blocks (units or patches). If the agents have a global view of the blockchain (or decentralized storage architecture) it is resource intensive in messaging, however, this does enable the agents to sense where gaps may exist.

At step 1104, the agents then manage the growth of the underlying decentralized storage network (as part of this, and in parallel with the steps shown, at 1105, each agent broadcasts to the other agents, the services that the respective agent is offering (can offer) to the overall system of agents. This is a known function of agents, once an agent starts running, it broadcasts/advertises agent messages, advertising its functions to the other agents. For example, one agent could offer a signing service, another could offer an auditing service or some similar service.

Once the system of agents begins exchanging messages, some of these messages will be inter-agent management messages (for example, determining between agents, which peers of the network will be managed by each agent) and other messages could be a first agent telling a second agent that the first agent has a block/patch that the first agent is requesting should be added to the archive. The second agent would then receive the message from the first agent (the details of inter-agent messaging are also well known), and, at step 1106, the second agent will assess (step 1107) the validity/integrity of the patches/blocks that are being proposed by the first agent (based on the certification being presented, based on the standard encryption (e.g, hash) protocol that is chosen) as well as assessing (step 1108) the validity of the first agent submitting the new patch/block (is this first agent to be trusted, based on its certificates). If either of these assessments is not approved, the block/patch being proposed is rejected (step 1109) by the second agent. If both of these assessments are approved, the new block is added to the storage/archive (step 1110) by the second agent. The above assessments could be done by one agent, or by a plurality of agents working together, as part of the system of distributed agents.

As part of the functionality just described, the software agent code itself can be written by the agent(s) into the archive as a new patch (or block) to increase the integrity of the agent code (digitally signing the agent code into the growing distributed storage archive/fabric). It is important that the code of each agent should conform to the original specification of the author or trusted party that created it. Accordingly, additional security can be created by periodically having each agent writes its current code state into a new block (patch or unit), which is then written into the wider blockchain (or decentralised storage architecture). Other agents may then verify that agent's state and agree if it meets a collective set of criteria. If it fails, then patches signed by that agent may be rejected and prior patches from the agent marked by a new hash signature to indicate reduced trust. The process may either write the entire code state of the agent into a new patch or just a hash digest of the code state, which would be more efficient.

An additional and optional security feature would be to specify that any new block (patch or unit) requires a set of N agents to collectively co-sign the new block (patch or unit) before it can be added to the decentralized storage network. This addition of multi-agent co-signing is important in establishing higher levels of trust and helps to reduce the need for proof of work operations (such as mining) which are computationally very expensive and which expend a considerable amount of physical energy.

As an example of this co-signing feature in operation, two users (A, B) agree to make a virtual transaction. A creates a new block and B countersigns to assert they agree with the transactions contained within it. In addition, the block is processed by the network of agents, and three agents in trusted organisations (Bank X, Solicitor Y, Internet Company Z), also countersign the same block. The block is then added to the blockchain. The resulting block now has a high level of transaction integrity.

The process of choosing the countersigning agents can itself be a distributed advertised service, where agents push inter-agent messages to each other advertising their signing credentials, and associated costs.

Figure 12:
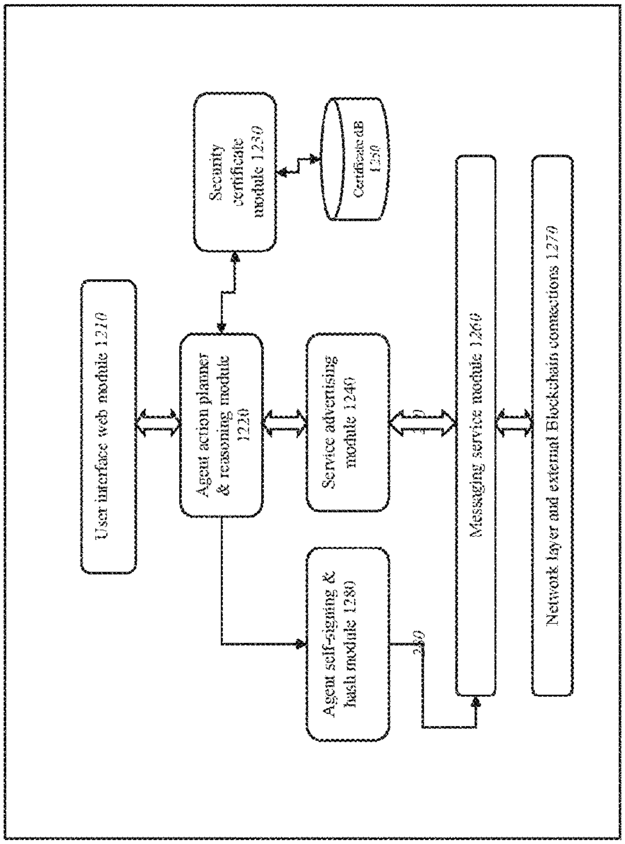
FIG. 12 is a block diagram showing software modules involved in the software agents carrying out the flowchart of FIG. 11.

FIG. 12 shows the software agent core modules which interact to carry out the functions described above with respect to FIG. 11. The basics of most of these software modules is known in the distributed agent area (all agents have an advertising service, messaging service, reasoning module, a database) and each module is customized to act in the specific distributed storage environment in which they are applied (e.g. the distributed patchwork architecture described earlier).

The user interface web module 1210 manages the human users' interactions with the agent. This module may also include a visualization of the decentralized archive and the current status of any active agents. Based on received agent messages, the user interface can be easily updated with a live view of the status of the decentralized archive. It is a GUI web interface, where the user can enter the specific operation protocols that the human user wants the agents to perform (from a library of choices), and the user specifies the number of agents that the user wants to use, and then activates them. The user can specify the specific application that the agents should be running, and details of the protocols such as single-agent signing versus multiple-agent signing (specifying the behaviour of the agent).

The agent action planner and reasoning module 1220 is the core inferencing and decision-making agent code. It parses the internal agent messages and selects actions from the set of available action plans the agent has available. This could be based on a range of known software agent decision engines and planning algorithms. At some user specified interval, (e.g. every 100 time steps), the planner selects a write-self action, where it invokes module (1280), to extract the agents current state, and or code, and writes these into a new block/patch which is then submitted via module (1260) to the distributed agent platform for writing into the decentralized archive. This creates a trusted record of the agent's code state and behaviour for future audit.

The security certificate module 1230: this software module checks and validates or rejects new certificates received within the inter-agent messages. Valid certificates are stored in the agents' database (1250), in order to check future messages from other agents. It would also be used to validate the digest integrity of any received blocks from other agents.

The service advertising module 1240: this software handles messages if selected by module 1220, in order to transmit a new message to other agents, advertising new services available from this agent. For example, this agent can countersign a block in exchange for some payment. It also specifies what services this agent is requesting from the agent community.

The messaging service module 1260: this is a common module within software agents, that processes all messages generated by the agent and processes received messages from other agents. It could be based on the open JADE agent protocol.

The network layer and external Blockchain connections module 1270: this is external to the agent and is the interface module to the underlying messaging library, e.g. Rabbitmq [https://www.rabbitmq.com/] or Apache Kafka [https://kafka.apache.org/], or an agent specific messaging layer.

The agent self-signing and hash module 1280: this module is new (not already known) and, on command from the agent action planner and reasoning module 1220, runs code to wrap up the agent's current state, which may be either the entire code base, or just the parameter state and associated security certificates (for efficiency, and to reduce the data space requirement.) Any third party or agent in the agent network/platform can then inspect an agent's state block/patch that has been written into the underlying decentralized store to check the validity of the agent's state.

In addition, this ability to self-sign a copy of the agent's code into the distributed store, means that a new trusted clone of this agent could be reconstituted at some new location/server, by an approved user or agent. This provides a secure means to help distribute a specific agent type across the network.

An additional new feature is that agents can exchange code sub-modules to add to or augment their current code base, as they can write signed modules of code into the distributed store. Another agent can extract the code from the distributed store and plug the code into their running code as they can validate that it is trusted.

The network of software agents as described above is especially useful in the management of a decentralised peer-to-peer storage network with complex or a multi-dimension topology, (such as the archive/patchwork architecture described in detail above). In this case the agents can validate that new blocks/patches may be added to a given storage unit, in effect, replacing the need for a proof of work, or proof of stake consensus.

Specifically, the agents can verify that patches (blocks or units) have sufficient cryptographic 'stitching' to bind them together into a well-connected network. They may also apply additional operations on patches (blocks or units) to create cryptographic verification links from them onto remote patches (blocks or units), or to perform search operations for particular units across the resulting decentralised store of units.

Possible use cases for the agents described above include Blockchain forensics (e.g., cybercrime investigations), Blockchain diagnostics or other such management/monitoring tools/applications.

In some cases, a smaller decentralised archive will represent a group of digital assets, such as minutes taken at a meeting, or contributions to a journal, and the entire smaller decentralised archive can be submitted to a larger decentralised archive (which might for example represent the series of meetings or series of journals.) In this case, an entire copy of all patches in the smaller archive may be appended together and treated as a single patch in the larger archive—or alternatively the logical structure of the patches are not necessarily represented by physical copies of the patches and where they are held. Preferably physical copies of the patches become distributed far and wide to increase resilience. Patches should preferably contain hash digests of their own content, which is further linked into the chaining digests so that consistency can be checked.

Also, two archives can be joined together. With two different decentralised archives and you want to join them together, you need to merge the PCPT tables so that you promote connections with new patches across the two fabrics. As soon as you have two tables and mix them together and still keep the priority order, any new patches will connect to both archives, and then, as soon as you have two patches connecting to both archives you have one big archive. Accordingly, two archives can be connected to form a larger archive, and merged by the action of merging information from PCPT tables of the two archives such that new patches have a tendency to connect to existing patches on both the archives such that the two data structures become inter-linked. Information on the index servers should also be mixed as well.

That is, it may be required to link information held in one instance of a connected data structure (fabric) with the information held in one or more other connected data structures. To do this, new patches are created which link to patches that are part of the previously disjoint fabrics. That is, a new patch links to an existing patch on one data structure/fabric as well as linking to an existing patch on another data structure/fabric. This can be achieved by merging information from a patch connection promotion service on each of the connected fabrics (where by fabric, we mean a cryptographically linked digital hypergraph or data structure, of entities). For example, the patch connection promotion service on fabric A sends some or all of its high priority patch IDs to the patch connection promotion service on fabric B, and vice versa. The peers associated with one fabric should also provide access control to peers associated with the other fabric, to enable the joining of the two fabrics via the patch connection process.

The above will now be described in more detail. By either merging the contents of the PCPS tables (datastores) and either merging or opening up access of the Patch Location services to peers on both parts of the two original patchwork fabrics, new patches will tend to form across old patches from both of the previously separate patchwork structures. Therefore, the two structures will become merged. In some cases, additional patches that contain only random strings or semantic information from another datastore can be written by agents with an aim to bridge the two fabrics with cryptographic links as quickly and often as possible. This is done by selecting the links for new patches with strict rules that they must include patches that were in both of the two patches. (It will be apparent that) this method can also be extended to join together more than one separate structure simultaneously by connecting them with new patches, by setting rules that steer (or select) new patches towards connecting to as large number of patches as possible.

In some implementations, when the PCP (Patch Creating Peer) notifies the Patch Connection Promotion Service (PCPS) that it has new information/content that it wants to create a new patch from (this stage of the patch may be termed a proto-patch, since the information is ready, but the patch does not yet have any connections and therefore does not have any token), the PCP may submit either the data or metadata associated with the new proto-patch to the PCPS, and the PCPS (or an associated service) may submit this information to a classifier (for example based on deep learning or another machine learning/AI technique) to assign tags or categories to the new proto-patch, and from this may select similar patches which it promotes for connection to by this new patch.

Two flow charts (FIGS. 13 and 14) will now be described showing the basic operation of the patchwork archive network.

Figure 13:
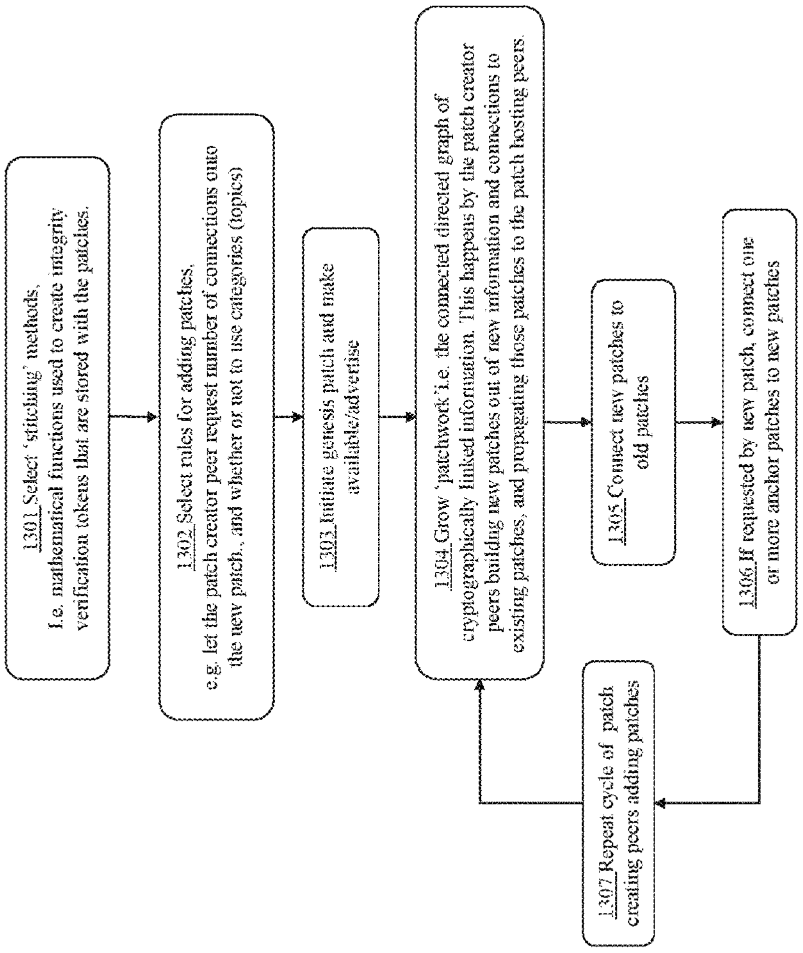
FIG. 13 is a flow chart showing steps involved in the operation of the network.

In FIG. 13, at step 1301, the stitching methods (e.g., mathematical functions used to create integrity verification tokens that are stored with the patches) are selected. At step 1302, rules are selected for adding patches (e.g., let the patch creator peer request number of connections onto the new patch, and whether or not to use categories/topics). At step 1303, the Genesis (initial) patches are made available and advertised. At step 1304, the patchwork is grown (i.e., the connected directed graph of cryptographically linked information. At step 1305, new patches are connected to old patches. At step 1306, if requested by the new patch, connect anchor patches to the new patches. Step 1307 shows the repeating of patch creating peers adding patches.

Figure 14:
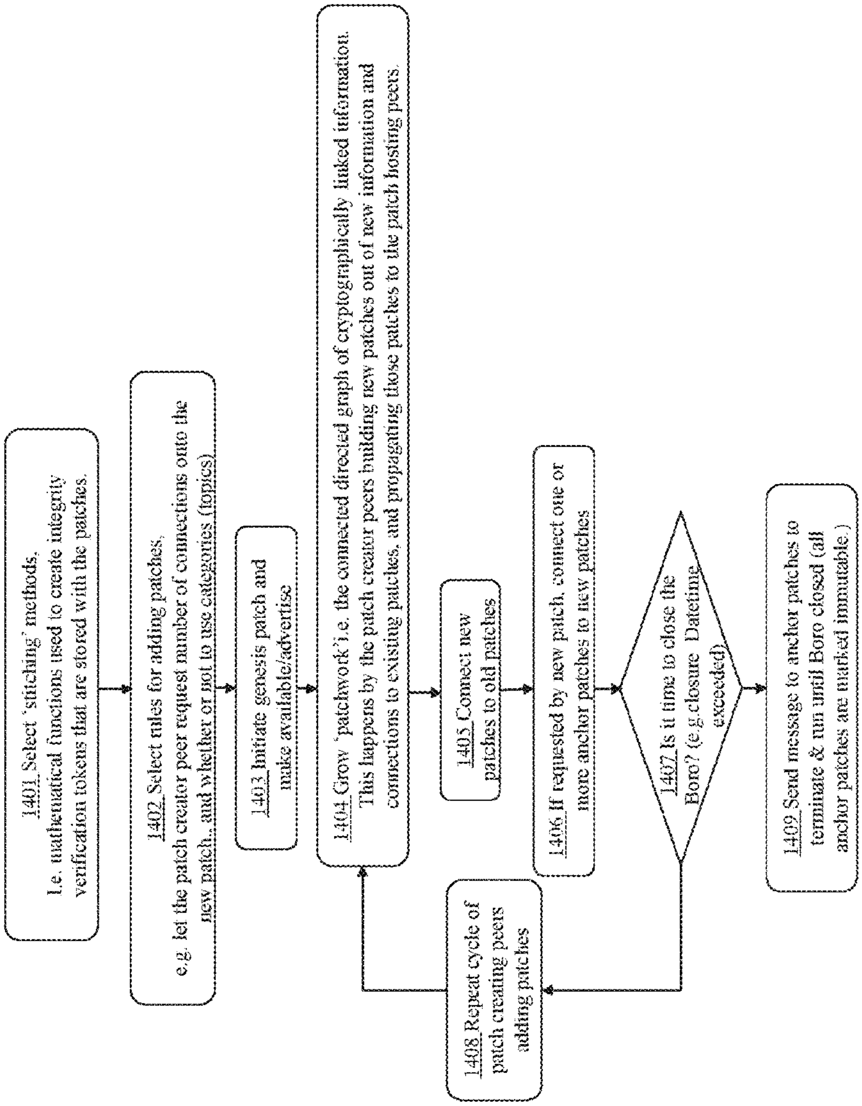
FIG. 14 is another flow chart showing steps involved in the operation of the network.

In FIG. 14, at step 1401, 'stitching' methods are selected, i.e., mathematical functions used to create integrity verification tokens that are stored with the patches. At 1402, rules are selected for adding patches, e.g., let the patch creator peer request number of connections onto the new patch, and whether or not to use categories (topics). At 1403, genesis patches are initiated and made available/advertised. At 1404, the 'patchwork' is grown, i.e. the connected directed graph of cryptographically linked information. This happens by the patch creator peers building new patches out of new information and connections to existing patches and propagating those patches to the patch hosting peers. At 1405, new patches are connected to old patches. At 1406, if requested by a new patch, connect anchor patches to new patches. At 1407, a determination is made as to whether it is time to close the fabric archive (e.g., closure datetime exceeded). If it is, then at 1409, a message is sent to anchor patches to terminate and run until the archive patchwork is closed (all anchor patches are marked immutable). If it is not, then at step 1408, the cycle is repeated of patch creating peers adding patches.

In some embodiments the digital assets, and/or other data structures associated with the ledger/archive datastore, may be stored in a No-SQL database. The No-SQL database is very suitable for hosting the connected directed graph(s) associated with the verification links between patches. An additional software layer, implemented in software running at the peers, and within the software and rules encoded within the patches themselves, will provide the additional required functionality required for an implementation, such as selectivity of connections, cryptographic calculations, and verifications. A decentralised No-SQL database is preferable, to reflect the fact that in most implementations, the patches have cryptographic verification links to other patches which are preferably hosted at different peers.

The following is one possible, but non-exclusive implementation of the digital archive patchwork network process, applied to the music track management area, and refers to the example shown in FIG. 3.

A user creates a new audio/music track and wishes to record the copyright. The following steps define the application process:

1. User authenticates themselves to a server via some preferred authentication channel, e.g., two factor authentication via a smartphone app and QR code.
2. User uploads their data object (e.g., mp3 file) to a web server.
3. The server creates a hash digest of the target file and assigns it to a new a patch with the user's authentication details, which may be as a digital signature.
4. The server writes the new patch to the distributed network, by locating a preferred server and transmitting the new patch via the connecting network.
5. The receiving server validates the patch meets the current application and cryptographic criteria, and if accepted stiches the patch to n local patches visible to that server. The stitching criteria may include the degree of semantic similarity between the new patch and the existing patches visible to the current server.
6. These patches may be local to the server or remote.

7. The process repeats until the new patch has been stitched to a sufficient number of existing patches. (Defined by the application.)
8. The application administrator or owners of the genesis patch for this application can at some point activate the terminate patches, which then close this specific patchwork.

Finally, some example ways of connecting patches will be described below.

The patch is made up of the new content (new digital string, which is application dependent)+token (which in most embodiments includes a string defining all the defined linkages onto other patches and includes the verifiable quantities which are derived from the linked patches and the content of the new patch using cryptographic functions). There are a number of ways in which the verifiable quantities (also referred to in this document as 'checksums') can be derived using cryptographic functions. These include the following:

In the following text, and as explained elsewhere, the strings associated with the patches being linked onto are preferably the full patch, i.e., including the content and token, or in some embodiments they may be just the token, in order to decrease the amount of processing and use less computational power.

The following list is not exhaustive, but provides examples of ways that a new patch can link onto existing patches using cryptographic hash functions. We define this as 'cryptographically linked onto', which is used as shorthand for any one, or a variant of, these methods in other parts of this document:

1. Calculating a standard cryptographic hash of the concatenation of all the strings associated with the patches being linked onto, plus the string of the new patch content.
2. Calculating individual hash functions of linked patches, and concatenating them together (this method is not normally preferred, as it increases the degrees of freedom for fraudulent mutation, particularly of new patches which are not yet well connected onto.)
3. Alternative implementations would include finding the value which is added to the concatenation of the linked onto digital assets (patches) which hashes (using some choice of cryptographic hash function) to a fixed string. In other words, solving a hash completion problem (e.g. solving for the string newpatchtokenstring in the following identity (relationship):
   A pre-defined fixed string such as "000000" or the string associated with the version and ID of a particular anchor patch=HASH (new patch-content-string concatenated with all patch-strings that are linked onto by the new patch, concatenated with the newpatchtokenstring).
4. The choice of cryptographic hash function may be fixed or context dependent, e.g. dependent on current time or determined by inheritance from the new patch template, or written into rules which are encoded into the linked onto patches, and where there may be some precedence defined as a rule of the embodiment when selecting from a set of different possible cryptographic hash functions that are suggested by the context.
5. In some embodiments the choice of cryptographic hash function is determined by the value of the new patch content. For example, an ordered list of $2^n$ (2 to the power n) cryptographic functions is defined, and the index into this list is equal to the result of another hash function (which may or may not be a cryptographic hash function) that maps the value of the new patch content to an output string of length n bits.

In some implementations, the hash function used to calculate the digest may be a compound hash function, for example the application of a second hash function (which may be the same function, or a different function, to the first hash function). A digital signature may be appended to the record before calculating the hash function or before calculating the second hash function, and in this case this digital signature will be included in the bit string over which the final digest is calculated.

The invention claimed is:

1. A method of storing storage units representing digital assets into a decentralised repository arranged in a peer-to-peer network comprising of a plurality of peer computing systems, to create an archive of the digital assets, comprising steps of, for each new storage unit being submitted to the archive by a submitting peer computing system:

determining a specific quantity of stored existing storage units, each of which the new storage unit is to be cryptographically linked to, where the existing storage units have been previously submitted to the archive;

selecting specific ones of all of the existing storage units up to the received specific quantity of stored existing storage units, where the selection has been made from existing storage units stored by specific ones of the peer computing systems;

performing cryptographic processing by taking, as inputs to such cryptographic processing, the selected specific existing storage units and the new storage unit, and obtaining a result of such cryptographic processing;

adding the result into the new storage unit; and distributing the new storage unit to the plurality of peer computing systems, thereby adding the new storage unit to the decentralised repository;

wherein the selecting step is carried out based on a semantic content of the new storage unit.

2. The method of claim 1 further comprising the step of adding a reference to each of the selected specific existing storage unit into the new storage unit.

3. The method of claim 1, further comprising the step of determining a specific quantity of peer computing systems each of which stores a plurality of existing storage units, where the specific quantity of peer computing systems is to be used to access the specific quantity of existing storage units, and wherein selecting specific ones of all of the existing storage units up to the received specific quantity of stored existing storage units, where the selection has been made from existing storage units stored by specific ones of the peer computing systems up to the received specific quantity of peer computing systems.

4. The method of claim 1, wherein the specific quantity of stored existing storage units is determined by calculating a metric based on a plurality of criteria.

5. The method of claim 4, wherein the plurality of criteria include a current size of the peer-to-peer network making up the decentralised repository, and a required security level.

6. The method of claim 1, wherein the selecting step is carried out using a storage unit connection promotion table, which stores identifiers of existing storage units for which the performing cryptographic processing step has been carried out with respect to a number of other existing storage units said number being below a threshold, where such identifiers are located in the table in a position so as to be given priority in the carry out of the selection step.

7. The method of claim 6, wherein the storage unit connection promotion table also stores identifiers of the other existing storage units for which the performing cryptographic processing step has been carried out.

8. The method of claim 1, wherein the distributing step distributes the new storage unit to less than all of the plurality of peer computing systems.

9. The method of claim 1, wherein the submitting peer computing system submitting the new storage unit to the decentralised repository determines a path through a plurality of existing storage units in the decentralised repository from a location of the new storage unit to a location of a first existing storage unit, where a peer computing system hosting the first existing storage unit performs a cryptographic processing function taking as inputs a current version of the first existing storage unit and the result of the performing cryptographic processing step for each storage unit in the determined path to produce an output of the cryptographic function, and storing the output of the cryptographic function into a new version of the first storage unit.

10. The method of claim 9, wherein the current version of the first existing storage unit and the new version of the first existing storage unit are both stored by the peer computing system hosting the first existing storage unit.

11. The method of claim 1, wherein one of the peer computing systems operates as a storage unit location index server which performs the function of identifying existing storage units and providing addresses of peer computing systems that store such identified storage units.

12. The method of claim 1, wherein one of the peer computing systems operates as a peer location server which performs the function of providing, to the submitting peer computing system, addresses of peer computing systems which store existing storage units.

13. A non-transitory computer-readable storage medium storing a computer program comprising instructions for carrying out all the steps of the method according to claim 1, when said computer program is executed on a computer system.

14. A system comprising a plurality of computers for storing storage units representing digital assets into a decentralised repository arranged in a peer-to-peer network comprising of a plurality of peer computing systems, to create an archive of the digital assets, the plurality of computers being at least configured to, for each new storage unit being submitted to the archive by a submitting peer computing system:

determine a specific quantity of stored existing storage units, each of which the new storage unit is to be cryptographically linked to, where the existing storage units have been previously submitted to the archive;

select specific ones of all of the existing storage units up to the received specific quantity of stored existing storage units, where the selection has been made from existing storage units stored by specific ones of the peer computing systems;

perform cryptographic processing by taking, as inputs to such cryptographic processing, the selected specific existing storage units and the new storage unit, and obtaining a result of such cryptographic processing;

add the result into the new storage unit; and distribute the new storage unit to e the plurality of peer computing systems, thereby adding the new storage unit to the decentralised repository;

wherein the selection is carried out based on a semantic content of the new storage unit.

15. The system of claim 14, wherein the plurality of computers is further configured to determine a specific quantity of peer computing systems each of which stores a plurality of existing storage units, where the specific quantity of peer computing systems is to be used to access the specific quantity of existing storage units, and wherein selection of specific ones of all of the existing storage units up to the received specific quantity of stored existing storage units, where the selection has been made from existing storage units stored by specific ones of the peer computing systems up to the received specific quantity of peer computing systems.

16. The system of claim 14, wherein plurality of computers is further configured to use a storage unit connection promotion table, which stores identifiers of existing storage units for which the performance of cryptographic processing step has been carried out with respect to a number of other existing storage units said number being below a threshold, where such identifiers are located in the table in a position so as to be given priority in the carry out of the selection step.

17. The system of claim 14, wherein the submitting peer computing system submitting the new storage unit to the decentralised repository is configured to determine a path through a plurality of existing storage units in the decentralised repository from a location of the new storage unit to a location of a first existing storage unit, where a peer computing system hosting the first existing storage unit is configured to perform a cryptographic processing function taking as inputs a current version of the first existing storage unit and the result of the performance of the cryptographic processing for each storage unit in the determined path to produce an output of the cryptographic function, and store the output of the cryptographic function into a new version of the first storage unit.

18. The system of claim 14, wherein one of the peer computing systems is configured to operate as a storage unit location index server which performs the function of identifying existing storage units and providing addresses of peer computing systems that store such identified storage units.

19. The system of claim 14, wherein one of the peer computing systems is configured to operate as a peer location server which performs the function of providing, to the submitting peer computing system, addresses of peer computing systems which store existing storage units.

20. A method of storing storage units representing digital assets into a decentralised repository arranged in a peer-to-peer network comprising of a plurality of peer computing systems, to create an archive of the digital assets, comprising steps of, for each new storage unit being submitted to the archive by a submitting peer computing system:

determining a specific quantity of stored existing storage units, each of which the new storage unit is to be cryptographically linked to, where the existing storage units have been previously submitted to the archive;

selecting specific ones of all of the existing storage units up to the received specific quantity of stored existing storage units, where the selection has been made from existing storage units stored by specific ones of the peer computing systems;

performing cryptographic processing by taking, as inputs to such cryptographic processing, the selected specific existing storage units and the new storage unit, and obtaining a result of such cryptographic processing;

adding the result into the new storage unit; and distributing the new storage unit to the plurality of peer computing systems, thereby adding the new storage unit to the decentralised repository; wherein:

(i) one of the peer computing systems operates as a storage unit location index server which performs the function of identifying existing storage units and providing addresses of peer computing systems that store such identified storage units; or (ii) one of the peer computing systems operates as a peer location server which performs the function of providing, to the submitting peer computing system, addresses of peer computing systems which store existing storage units.

* * * * *